United States Patent [19]
Hashimura

[11] Patent Number: 5,923,478
[45] Date of Patent: Jul. 13, 1999

[54] ZOOM LENS SYSTEM

[75] Inventor: Junji Hashimura, Sakai, Japan

[73] Assignee: Minolta Co., Ltd., Osaka, Japan

[21] Appl. No.: 08/874,916

[22] Filed: Jun. 13, 1997

[30] Foreign Application Priority Data

Jun. 14, 1996 [JP] Japan .................................. 8-153927

[51] Int. Cl.$^6$ .................................................. G02B 15/14
[52] U.S. Cl. ........................................ 359/686; 359/687
[58] Field of Search .................................... 359/652, 653, 359/654, 687, 686

[56] References Cited

U.S. PATENT DOCUMENTS

| | | | |
|---|---|---|---|
| 4,976,521 | 12/1990 | Ishii et al. | 350/423 |
| 4,998,807 | 3/1991 | Uzawa et al. | 350/426 |
| 5,046,833 | 9/1991 | Tsuchida | 359/654 |
| 5,184,251 | 2/1993 | Tsuchida et al. | 359/654 |
| 5,313,328 | 5/1994 | Aoki | 359/654 |
| 5,321,552 | 6/1994 | Horiuchi et al. | 359/654 |
| 5,541,775 | 7/1996 | Kiriki | 359/654 |

FOREIGN PATENT DOCUMENTS 4-63312   2/1992   Japan .

*Primary Examiner*—Georgia Epps
*Assistant Examiner*—Michael A. Lucas
*Attorney, Agent, or Firm*—Sidley & Austin

[57] ABSTRACT

The object of the present invention is to provide a high-performance zoom lens system that has a small number of lens elements and can also be used for wide-angle purpose. In order to achieve the object, said zoom lens system has, from the object side, a first lens unit having positive refractive power, a second lens unit having negative refractive power, a third lens unit having positive refractive power and a fourth lens unit having positive refractive power, wherein said zoom lens system varies magnification by changing a distance between at least said first and second lens units, wherein at least one of said lens units includes a gradient index lens, said gradient index lens having at least one aspherical surface.

38 Claims, 6 Drawing Sheets

FNO=1.85

SPHERICAL ABERRATION
SINE CONDITION

Y'=2.4

ASTIGMATISM

Y'=2.4

DISTORTION %

FNO=2.14

SPHERICAL ABERRATION
SINE CONDITION

Y'=2.4

ASTIGMATISM

Y'=2.4

DISTORTION %

FNO=2.65

SPHERICAL ABERRATION
SINE CONDITION

Y'=2.4

ASTIGMATISM

Y'=2.4

DISTORTION %

FIG.8A
FNO=1.85
FIG.8B
Y'=2.4
FIG.8C
Y'=2.4
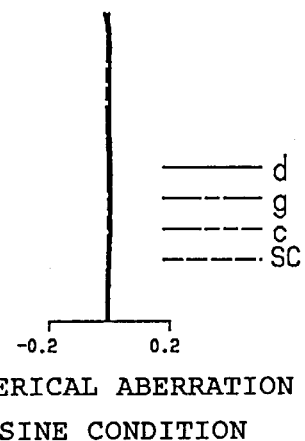
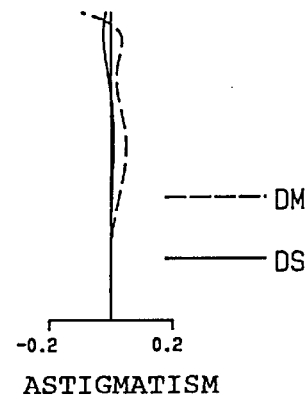
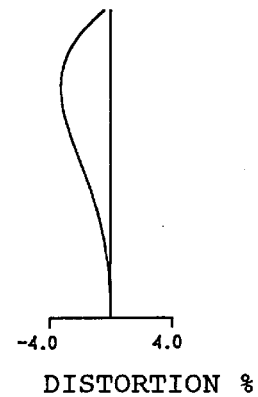
SPHERICAL ABERRATION
SINE CONDITION
ASTIGMATISM
DISTORTION %
FIG.9A
FNO=2.14
FIG.9B
Y'=2.4
FIG.9C
Y'=2.4
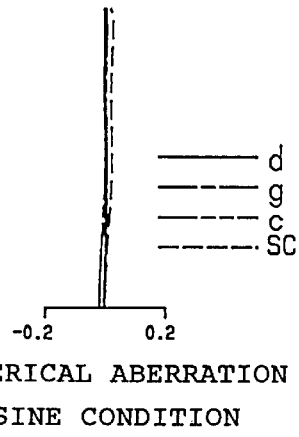
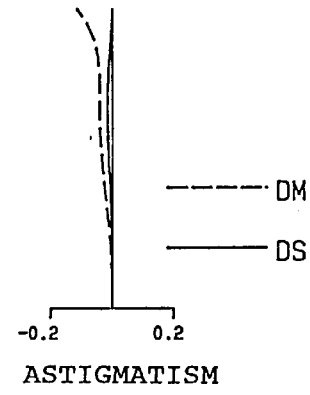
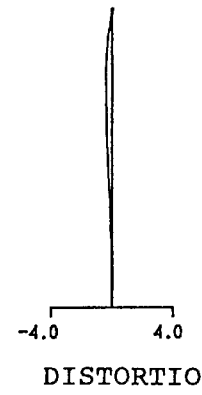
SPHERICAL ABERRATION
SINE CONDITION
ASTIGMATISM
DISTORTION %
FIG.10A
FNO=2.65
FIG.10B
Y'=2.4
FIG.10C
Y'=2.4
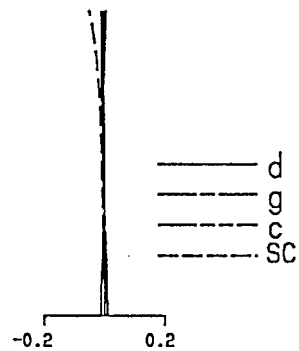
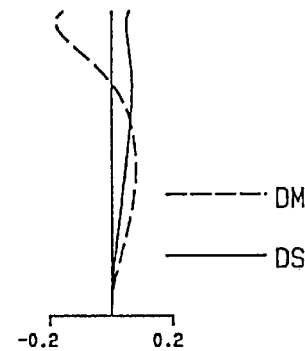
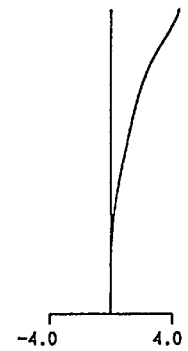
SPHERICAL ABERRATION
SINE CONDITION
ASTIGMATISM
DISTORTION %

FNO=1.85

-0.2  0.2
SPHERICAL ABERRATION
SINE CONDITION

Y'=2.4

-0.2  0.2
ASTIGMATISM

Y'=2.4

-4.0  4.0
DISTORTION %

FNO=2.14

-0.2  0.2
SPHERICAL ABERRATION
SINE CONDITION

Y'=2.4

-0.2  0.2
ASTIGMATISM

Y'=2.4

-4.0  4.0
DISTORTION %

FNO=2.65

-0.2  0.2
SPHERICAL ABERRATION
SINE CONDITION

Y'=2.4

-0.2  0.2
ASTIGMATISM

Y'=2.4

-4.0  4.0
DISTORTION %

FNO=1.85

SPHERICAL ABERRATION
SINE CONDITION

Y'=2.4

ASTIGMATISM

Y'=2.4

DISTORTION %

FNO=2.14

SPHERICAL ABERRATION
SINE CONDITION

Y'=2.4

ASTIGMATISM

Y'=2.4

DISTORTION %

FNO=2.25

SPHERICAL ABERRATION
SINE CONDITION

Y'=2.4

ASTIGMATISM

Y'=2.4

DISTORTION %

ZOOM LENS SYSTEM

BACKGROUND OF THE INVENTION

1. Field of the Invention

The present invention pertains to a zoom lens system, and more particularly to a zoom lens system having a high aperture ratio and capable of high magnification and appropriate for a still camera, video cameras etc.

2. Description of the Prior Art

Conventionally, in a zoom lens system used in a still camera or video cameras it has been desired to increase the aperture ratio and magnification while reducing the number of lens elements in the entire system in order to make the camera less costly and more compact. In response to this need, a technology has been proposed that reduces the number of lens elements in the entire zoom lens system by employing a gradient index lens (GRIN lens) while performing aberration correction.

For example, Japanese Laid-Open Patent Application 6-337347 proposes two types of zoom lens systems comprising, from the object side, a first lens unit having a positive refractive power, a second lens unit having a negative refractive power, a third lens unit having a positive refractive power and fourth lens unit having a positive refractive power. In one of the examples, the second and fourth lens units comprise a spherical GRIN lens and a spherical homogeneous lens, and in the other example, the second lens unit comprises a spherical GRIN lens and two homogeneous lenses having an aspherical surface, and the fourth lens unit comprises a GRIN lens and a spherical homogeneous lens.

Japanese Laid-Open Patent Application 4-369611 proposes a zoom lens system comprising, from the object side, a first lens unit having a positive refractive power, a second lens unit having a negative refractive power, a third lens unit having a positive refractive power and a fourth lens unit having a positive refractive power, where a spherical GRIN lens is used in one of said lens units such that either the first, third or fourth lens unit consists of a single lens element.

However, the zoom lens system discussed in said Japanese Laid-Open Patent Application 6-337347 has the problem that, because the GRIN lens is a flat lens, there is an insufficient degree of freedom to perform aberration correction, and adequate performance cannot be maintained. As a result, the problem arises that the number of lens elements in the lens units not containing a GRIN lens, such as the first lens unit, increases accordingly.

The zoom lens system discussed in Japanese Laid-Open Patent Application 4-369611 has the problem that the second lens unit comprises a large number of lens elements. In said zoom lens system, examples in which the first, third or fourth lens unit consists of a single lens element using a GRIN lens are proposed, but the second lens unit, which has the largest aberration correction effect to reduce the size of the zoom lens system, does not comprise two or fewer lens elements.

OBJECT AD SUMMARY

The object of the present invention is to provide a zoom lens system that has a high aperture ratio, is capable of high magnification and uses a small number of lens elements.

In order to achieve said object, the zoom lens system of the present invention comprises, from the object side, a first lens unit having a positive refractive power, a second lens unit having a negative refractive power, a third lens unit and a fourth lens unit, wherein at least one of said lens units includes a gradient index lens expressed by means of the following equation, said gradient index lens having at least one aspherical surface.

$$N(H)=N_0+N_1.H^2+N_2.H^4+N_3.H^6 \ldots$$

where,

H: height in the direction perpendicular to the optical axis;

$N_0$: refractive index along the optical axis; and $N_i$ (i=1,2,3 . . . ): 2ith refractive index distribution coefficient.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIGS. 8A through 8C show aberrations pertaining to the second embodiment in the shortest focal length condition.

FIGS. 9A through 9C show aberrations pertaining to the second embodiment in the middle focal length condition.

FIGS. 10A through 10C show aberrations pertaining to the second embodiment in the longest focal length condition.

DESCRIPTION OF THE PREFERRED EMBODIMENTS

The zoom lens system in which the present invention is applied will be explained below with reference to the drawings. FIGS. 1 through 4 respectively show the lens construction of the zoom lens systems of the first through fourth embodiments, and show the arrangement of the lens elements in the shortest focal length condition (W). The zoom lens systems of said embodiments are all zoom lens systems for a video camera.

In FIGS. 1 through 4, the zoom lens systems of the first through fourth embodiments each comprise, from the object side, first lens unit Gr1 having a positive refractive power, second lens unit Gr2 having a negative refractive power, third lens unit Gr3 having a positive refractive power, fourth lens unit Gr4 having a positive refractive power, and low-pass filter F.

Each of the zoom lens systems of the first through fourth embodiments has, in principle, a construction in which first lens unit Gr1 comprises a positive lens having a strongly curved convex surface on the object side, second lens unit Gr2 comprises either a negative lens having a strongly curved concave surface on the image side or a combination of a negative lens having a strongly curved concave surface on the image side and a negative lens with a convex surface on the image side, third lens unit Gr3 includes a positive lens having a strongly curved convex surface on the object side, and fourth lens unit Gr4 comprises a negative lens having a strongly curved convex surface on the object side.

Figure 1:
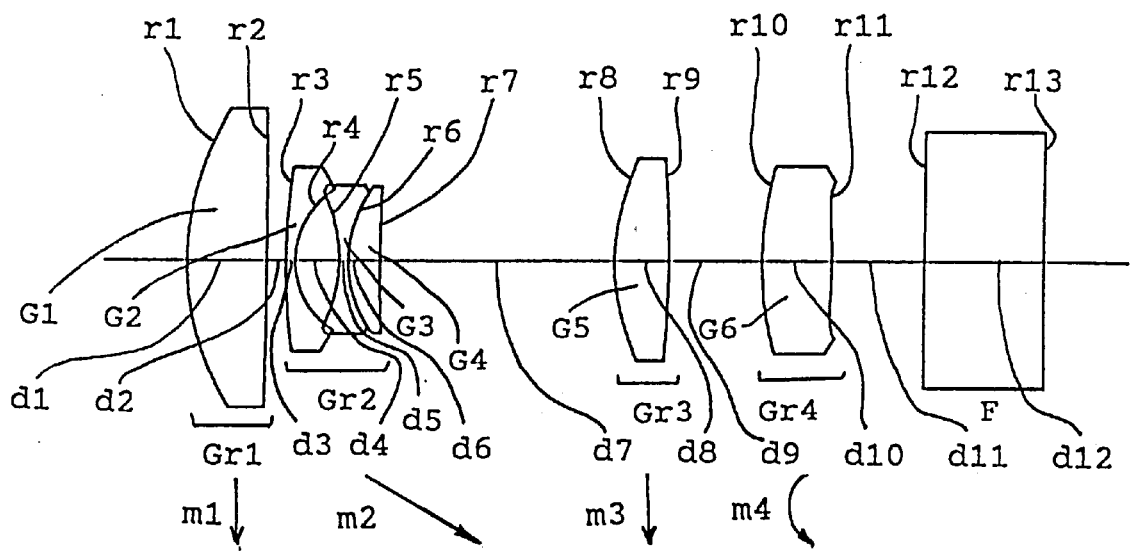
FIG. 1 shows the construction pertaining to a first embodiment of the zoom lens system of the present invention.

In the first embodiment shown in FIG. 1, first lens unit Gr1 comprises first lens element G1, which is a single GRIN lens having a positive meniscus configuration with the convex surface on the object side. Second lens unit Gr2 comprises second lens element G2, which is a negative meniscus homogeneous lens with the convex surface on the object side, third lens element G3, which is a homogeneous biconcave lens, and fourth lens element G4, which is a positive meniscus homogeneous lens with the convex surface on the object side, said object side surface being connected to the image side surface of said third lens element G3. Third lens unit Gr3 may comprise fifth lens element G5, which is a single homogeneous biconvex lens having a strongly curved convex aspherical surface on the object side. Fourth lens unit Gr4 may comprise sixth lens element G6, which is a single homogeneous biconvex lens having a strongly curved surface on the object side and an aspherical surface on the image side. In FIG. 1, arrows m1 through m4 indicate in a simplified fashion the movements of first lens unit Gr1 through fourth lens unit Gr4 of the zoom lens system of the first embodiment during zooming from the shortest focal length position to the longest focal length position.

Figure 2:
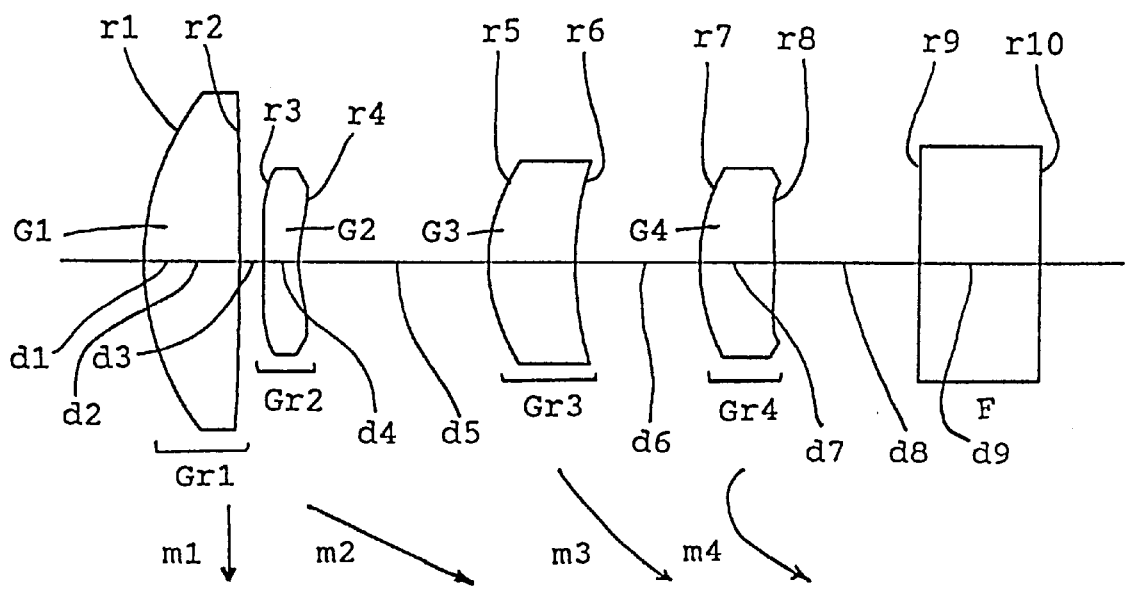
FIG. 2 shows the construction pertaining to a second embodiment of the zoom lens system of the present invention.

In FIG. 2, first lens unit Gr1 of the second embodiment comprises first lens element G1, which is a single GRIN lens having a positive meniscus configuration with the convex surface on the object side. Second lens unit Gr2 comprises second lens element G2, which is a single GRIN lens having a meniscus configuration in which both sides are aspherical and the convex surface is on the object side. Third lens unit Gr3 comprises third lens element G3, which is a single homogeneous biconvex lens having an aspherical surface on the object side. Fourth lens unit Gr4 comprises fourth lens element G4, which is a single biconvex GRIN lens having a strongly curved surface on the object side and an aspherical surface on the image side. In FIG. 2, arrows m1 through m4 indicate in a simplified fashion the movements of first lens unit Gr1 through fourth lens unit Gr4 of the zoom lens system of the second embodiment during zooming from the shortest focal length position to the longest focal length position.

Figure 3:
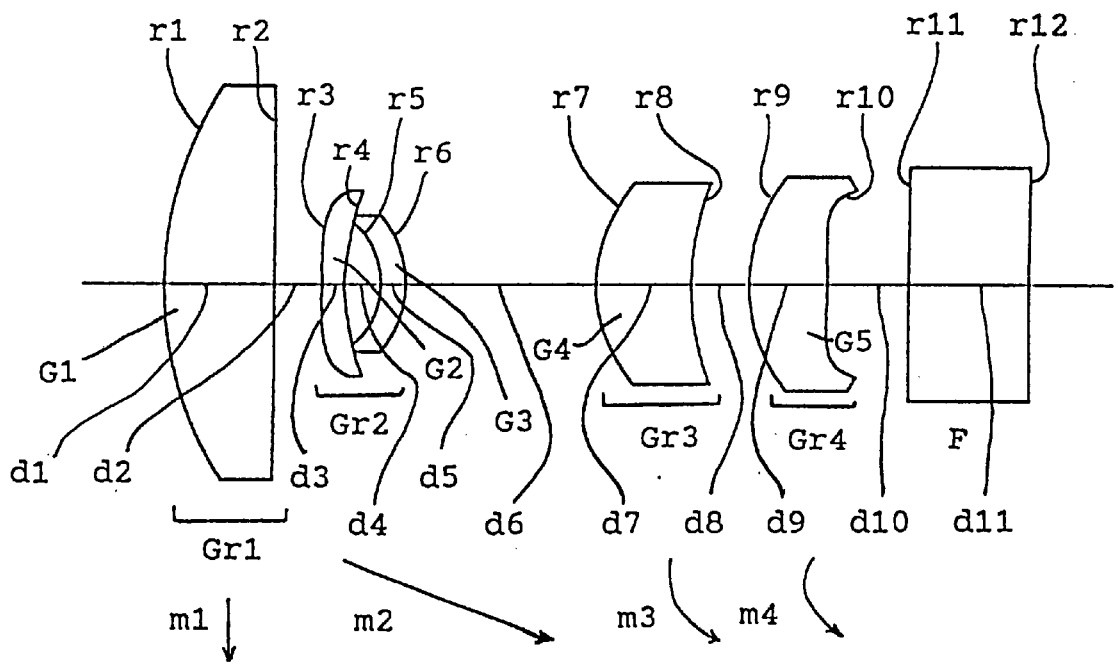
FIG. 3 shows the construction pertaining to a third embodiment of the zoom lens system of the present invention.

In FIG. 3, first lens unit Gr1 of the third embodiment comprises first lens element G1, which is a single GRIN lens having a positive meniscus configuration in which the convex surface is on the object side. Second lens unit Gr2 comprises second lens element G2, which is a negative meniscus GRIN lens having a concave surface on the object side and aspherical surfaces on both sides, and third lens element G3, which is a negative meniscus homogeneous lens having a convex surface on the image side. Third lens unit Gr3 comprises fourth lens element G4, which is a single positive meniscus homogeneous lens having a strongly curved convex surface on the object side, said surface also being aspherical. Fourth lens unit Gr4 comprises fifth lens element G5, which is a single biconvex GRIN lens having a strongly curved surface on the object side and an aspherical surface on the image side. In FIG. 3, arrows m1 through m4 indicate in a simplified fashion the movements of first lens unit Gr1 through fourth lens unit Gr4 of the zoom lens system of the third embodiment during zooming from the shortest focal length position to the longest focal length position.

Figure 4:
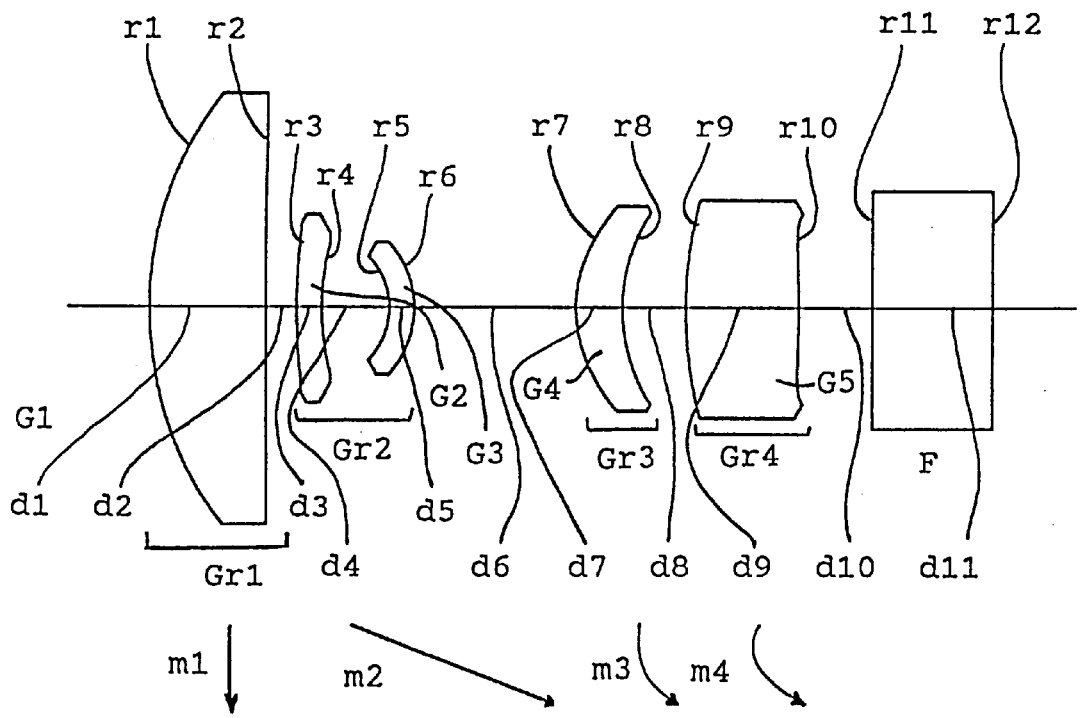
FIG. 4 shows the construction pertaining to a fourth embodiment of the zoom lens system of the present invention.
Figure 5A:
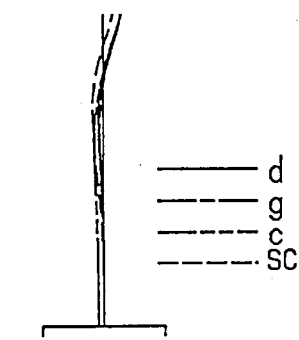
FIGS. 5A through 5C show aberrations pertaining to the first embodiment in the shortest focal length condition.
Figure 5B:
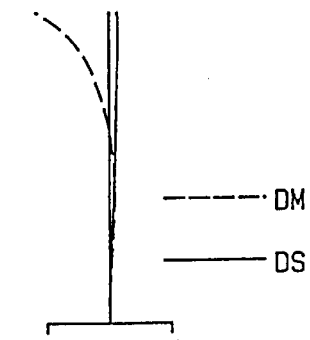
Figure 5C:
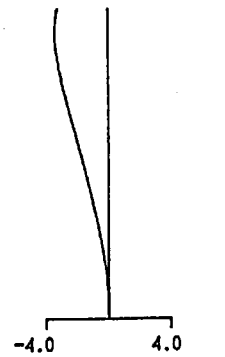
Figure 6A:
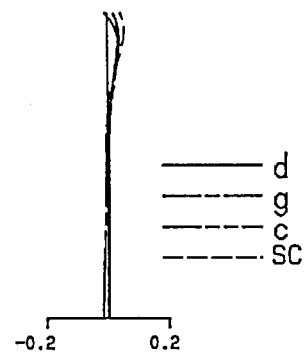
FIGS. 6A through 6C show aberrations pertaining to the first embodiment in the middle focal length condition.
Figure 6B:
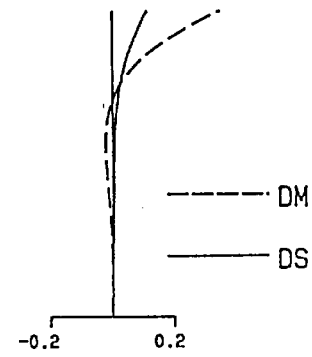
Figure 6C:
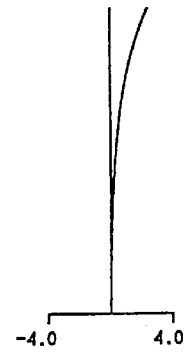
Figure 7A:
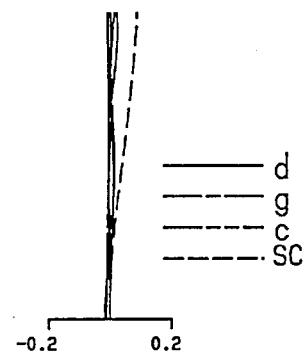
FIGS. 7A through 7C show aberrations pertaining to the first embodiment in the longest focal length condition.
Figure 7B:
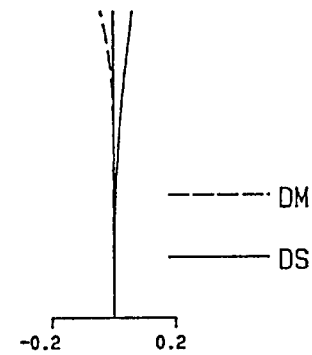
Figure 7C:
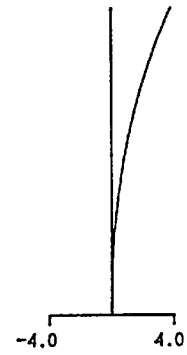
Figure 11A:
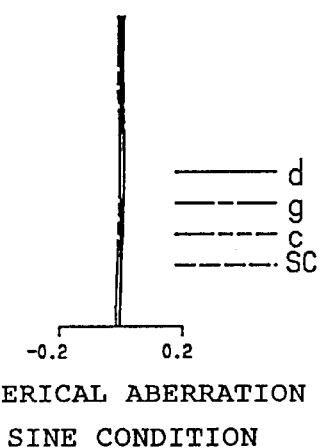
FIGS. 11A through 11C show aberrations pertaining to the third embodiment in the shortest focal length condition.
Figure 11B:
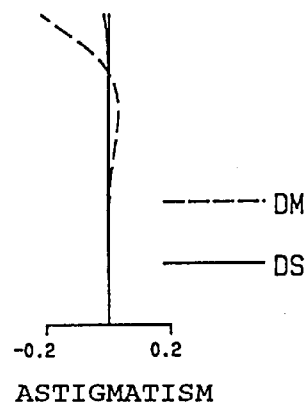
Figure 11C:
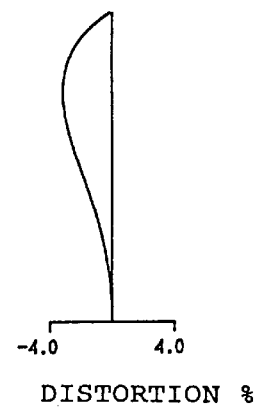
Figure 12A:
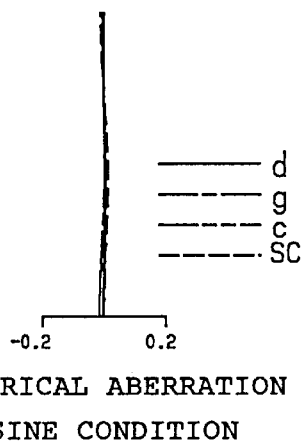
FIGS. 12A through 12C show aberrations pertaining to the third embodiment in the middle focal length condition.
Figure 12B:
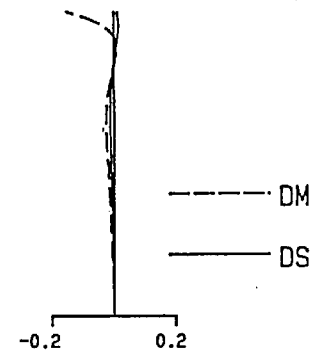
Figure 12C:
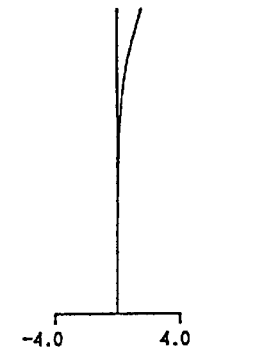
Figure 13A:
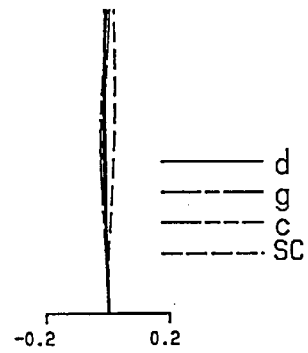
FIGS. 13A through 13C show aberrations pertaining to the third embodiment in the longest focal length condition.
Figure 13B:
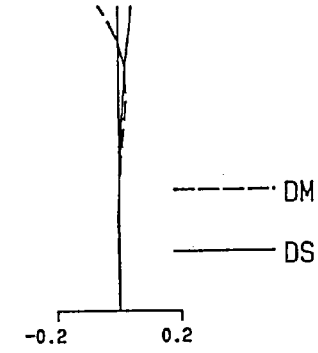
Figure 13C:
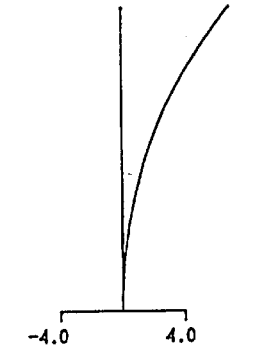
Figure 14A:
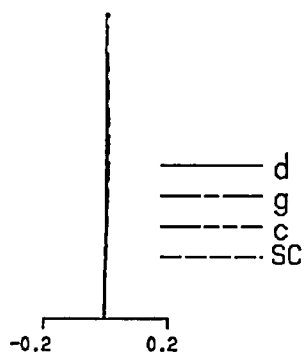
FIGS. 14A through 14C show aberrations pertaining to the fourth embodiment in the shortest focal length conditions
Figure 14B:
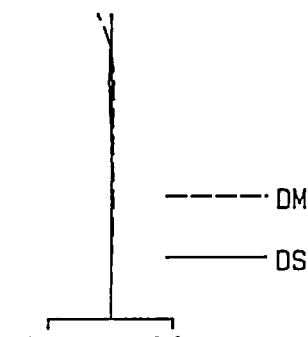
Figure 14C:
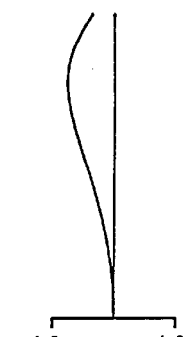
Figure 15A:
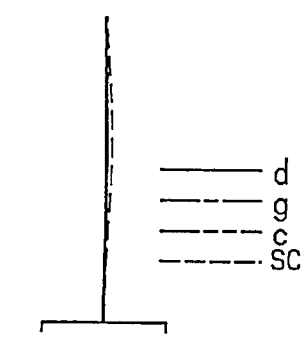
FIGS. 15A through 15C show aberrations pertaining to the fourth embodiment in the middle focal length condition.
Figure 15B:
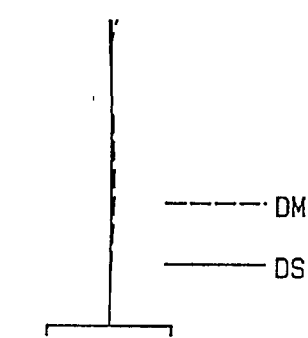
Figure 15C:
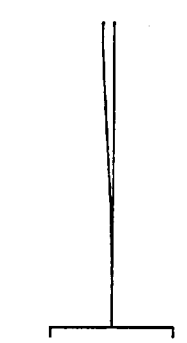
Figure 16A:
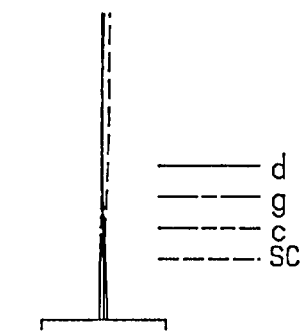
FIGS. 16A through 16C show aberrations pertaining to the fourth embodiment in the longest focal length condition.
Figure 16B:
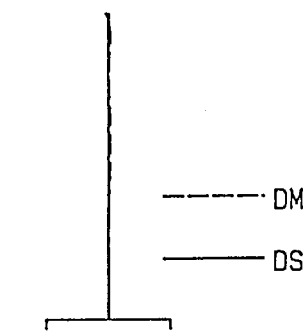
Figure 16C:
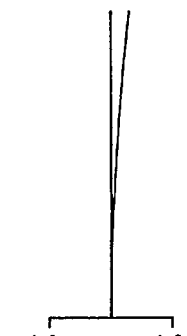

In FIG. 4, first lens unit Gr1 of the fourth embodiment comprises first lens element G1, which is a single GRIN lens having a positive meniscus configuration with the convex surface on the object side. Second lens unit Gr2 comprises second lens element G2, which is a negative meniscus GRIN lens with the convex surface on the object side and aspherical surfaces on both sides, and third lens element G3, which is a negative meniscus homogeneous lens with the convex surface on the image side. Third lens unit Gr3 comprises fourth lens element G4, which is a single homogeneous biconvex lens having a strongly curved aspherical surface on the object side. Fourth lens unit Gr4 comprises fifth lens element G5, which is a single biconvex GRIN lens having a strongly curved surface on the object side and an aspherical surface on the image side. In FIG. 4, arrows m1 through m4 indicate in a simplified fashion the movements of first lens unit Gr1 through fourth lens unit Gr4 of the zoom lens system of the fourth embodiment during zooming from the shortest focal length position to the longest focal length position.

The GRIN lenses used in the zoom lens systems of the first through fourth embodiments all have a refractive index distribution governed by the following equation:

$$N(H) = N_0 + N_1 \cdot H^2 + N_2 \cdot H^4 + N_3 \cdot N^6 \ldots \tag{1}$$

where,

H: height in the direction perpendicular to the optical axis;

$N_0$: refractive index along the optical axis; and $N_i$ (i=1,2,3 . . . ): 2ith refractive index distribution coefficient.

Equation (1) expresses the fact that the GRIN lens used in the zoom lens system of each embodiment is the type of GRIN lens in which the refractive index varies in the direction perpendicular to the optical axis (radial-type GRIN lens). In the explanation below, the term 'GRIN lens' will refer to a radial GRIN lens.

Conventionally, where a single focal point lens system is constructed using a spherical or flat GRIN lens, sufficient freedom in design may not be obtained for tertiary aberration correction, and therefore it is believed to be not possible for an optical system to comprise a single GRIN lens. (See, e.g., "Design of a Gradient-Index Photographic Objective", Appl. Opt., Vol. 21, 1982, pp. 993–998.) The same thing may be said regarding a zoom lens system: Where it is desired to have the lens units comprising a zoom lens system each comprise a single GRIN lens, aberration correction would be impossible due to the insufficient freedom in design for correction of tertiary aberration, and it is accordingly not possible for each of the lens units to comprise a single GRIN lens.

On the other hand, where the lens units comprising a zoom lens system comprise only aspherical or spherical homogeneous lenses, because chromatic aberration correction or Petzval sum correction cannot be performed even if the aspherical configuration is varied, it is not possible for the lens units to comprise a single lens element. Therefore, to perform correction of these aberrations, each lens unit must comprise at least two lens elements (one positive lens element and one negative lens element).

In the zoom lens systems of the embodiments, however, a GRIN lens is used in the lens units, and at least one surface of this GRIN lens is made aspherical. The result of this construction is that the design freedom to perform aberration correction increases and the number of lens elements comprising the zoom lens system may be reduced. Moreover, with this construction, a zoom lens system having a high aperture ratio and high magnification capability may be achieved while each lens unit of the zoom lens system comprises only a single lens element. Further, because the thickness of each lens unit may be reduced, the optical system may also be made compact.

Next, the conditions that must be met by the zoom lens systems of the embodiments will be sequentially explained.

It is desirable for the GRIN lens used in the zoom lens systems of the embodiments to satisfy condition (2) set forth below.

$$0.0 < sgn(\phi G) \cdot \frac{N_1}{\phi G^2} < 10.0 \quad (2)$$

where, sgn($\phi$G): parameter whose value becomes +1 when the refractive power of the lens unit including a GRIN lens is negative, and −1 when the refractive power of the lens unit including a GRIN lens is positive;

$N_1$: secondary refractive index distribution coefficient of the GRIN lens; and $\phi$G: refractive power of the GRIN lens.

Condition (2) concerns the refractive index distribution of the GRIN lens, and is mainly a condition for performing Petzval sum correction in the lens unit incorporating a GRIN lens. Where this range is exceeded, Petzval sum correction using the GRIN lens becomes difficult and the refractive index distribution becomes large, making manufacturing undesirably difficult.

Conventionally, in a zoom lens system such as the zoom lens systems of the embodiments, comprising, from the object side, a first lens unit having a positive refractive power, a second lens unit having a negative refractive power, a third lens unit and a fourth lens unit, where it is desired to make the optical system more compact, the negative refractive power of the second lens unit must be made extremely large. Consequently, where the second lens unit comprises only homogeneous lenses, at least two negative lens elements are necessary in order to correct the negative increase in the Petzval sum in the second lens unit. In addition, there must be at least one positive lens in the second lens unit to perform correction of chromatic aberration. Therefore, a minimum of three lens elements is necessary for the second lens unit. Given this situation, it is very difficult to reduce the number of lens elements in the second lens unit using only homogeneous lenses.

With this as a backdrop, it is hoped that by using a GRIN lens in the second lens unit, the number of lens elements in the second lens unit may be reduced. However, because the refractive power of the second lens unit must be extremely large, it is very difficult to assure adequate performance and to reduce the number of lens elements using a spherical or flat GRIN lens. Consequently, in the zoom lens systems of the second through fourth embodiments that comprise, from the object side, a first lens unit having a positive refractive power, a second lens unit having a negative refractive power, a third lens unit and a fourth lens unit, a GRIN lens that is expressed by means of equation (1) is used in the second lens unit, and at least one of the lens surfaces in the second lens unit is made an aspherical surface. As a result, the second lens unit may consist of either one or two lens elements.

Where a GRIN lens is used in the second lens unit and at least one of the lens surfaces in the second lens unit is made aspherical, it is desirable for the second lens unit to comprise either a single GRIN lens or a GRIN lens and a homogeneous lens. From the standpoint of reducing the number of lens elements, it is desirable for the second lens unit to consist of a single GRIN lens. However, where the second lens unit is to have a large refractive power, if the second lens unit comprises only a single GRIN lens, its refractive power distribution becomes large and manufacturing becomes extremely difficult. Therefore, where a GRIN lens is used in the second lens unit, a second lens unit construction of either a single GRIN lens or a GRIN lens and a homogeneous lens may be chosen depending on the desired refractive power of the second lens unit. Where the second lens unit comprises a GRIN lens and a homogeneous lens, the refractive index distribution of the GRIN lens may be reduced, making the GRIN lens easier to manufacture. In addition, the cost of this construction is lower than that in which two GRIN lenses are used. It is furthermore desirable for at least one of the surfaces of the GRIN lens in the second lens unit to be aspherical. By making at least one of the surfaces aspherical, freedom in design in terms of aberration correction in the second lens unit may be increased.

It is desirable for the GRIN lens used in the second lens unit to satisfy condition (3) set forth below.

$$-5.0 < \frac{N_1 d2}{\phi_2^2} < 10.0 \quad (3)$$

where, $N_1 d2$: secondary refractive index distribution coefficient of the GRIN lens used in the second lens unit relative to the d-line; and $\phi_2$: refractive power of the second lens unit.

Condition (3) pertains to the refractive index distribution of the GRIN lens used in the second lens unit, and is mainly a condition for performing Petzval sum correction in the second lens unit. If the lower limit of condition (3) is exceeded, the second lens unit Petzval sum increases in the negative direction, which is undesirable. If the upper limit of condition (3) is exceeded, Petzval sum correction by the GRIN lens becomes excessive, and the refractive index distribution becomes large, making manufacturing difficult.

Where a GRIN lens is used in the first lens unit, it is desirable for said GRIN lens to satisfy conditions (4), (5) and (7) set forth below.

In a range defined by 0<H<0.5 H max, $$\frac{d}{dH}\{\nu_d(H)\} < 0.0 \qquad (4)$$

In a range defined by 0<H<H max, $$-1.0 < \frac{\nu_d(H) - \nu_d(0)}{\nu_d(0)} \le 0.0 \qquad (5)$$

where,

H: height in the direction perpendicular to the optical axis;

H max: maximum value for height in the direction perpendicular to the optical axis (effective aperture);

d/dH: differential symbol; and $\nu_d(H)$: dispersion of the GRIN lens at a point that is height H away from the optical axis, in the direction perpendicular to the optical axis, as expressed by means of the following equation:

$$\nu_d(H) = \frac{N_d(H) - 1}{N_F(H) - N_C(H)} \qquad (6)$$

where, $N_d(H)$: d-line refractive index at height H;
$N_F(H)$: F-line refractive index at height H; and
$N_C(H)$: C-line refractive index at height H.

$$-0.1 < \frac{N_1\lambda 1 - N_1 d1}{\phi 1G^2} < 0.1 \qquad (7)$$

where, $N_1 d1$: secondary refractive index distribution coefficient of the GRIN lens used in the first lens unit relative to the d-line;

$N_1 \lambda 1$: secondary refractive index distribution coefficient of the GRIN lens used in the first lens unit relative to the C-line or the F-line; and, $\phi 1G$ refractive power of the GRIN lens used in the first lens unit.

Where a GRIN lens is used in the first lens unit, the GRIN lens serves mainly to perform correction of chromatic aberration. Conditions (4), (5) and (7) are conditions governing dispersion and the refractive index distribution coefficients, which must be satisfied by the GRIN lens in the first lens unit. Where the ranges defined by these conditions are exceeded, color correction in the entire optical system becomes extremely difficult due to the chromatic aberration arising in the first lens unit.

Moreover, where a GRIN lens is used in the first lens unit, it is desirable for its refractive index distribution coefficients to satisfy conditions (8) and (9) set forth below.

$$-2.0 < \frac{N_1 d1}{\phi 1G^2} < 1.0 \qquad (8)$$

$$\left|\frac{N_2 d1}{\phi 1G^4}\right| < 100 \qquad (9)$$

where, $N_1 d1$: secondary refractive index distribution coefficient of the GRIN lens used in the first lens unit relative to the d-line;

$N_2 d1$: quaternary refractive index distribution coefficient of the GRIN lens used in the first lens unit relative to the d-line; and, $\phi 1G$: refractive power of the GRIN lens used in the first lens unit.

Conditions (8) and (9) are conditions governing the refractive index distribution coefficients, which must be satisfied by a GRIN lens when it is used in the first lens unit. Where the ranges defined by these conditions are exceeded, the refractive index distribution becomes too large. In particular, spherical aberration and off-axial coma aberration become large in the longest focal length condition and higher order aberrations also arise, which is not desirable.

Where a GRIN lens is used in the first lens unit, it is desirable for said GRIN lens to satisfy condition (10) set forth below.

$$-0.2 < \frac{\phi 1GM}{\phi 1GS} < 0.5 \qquad (10)$$

where, $\phi 1GS$: refractive power of the surface of the GRIN lens used in the first lens unit; and $\phi 1GM$: refractive power of the medium of the GRIN lens used in the first lens unit.

Here, where the refractive power of the GRIN lens used in the first lens unit is deemed $\phi 1G$, $\phi 1GS$ and $\phi 1GM$ are expressed by means of the following equation.

$$\phi 1G = \phi 1GM + \phi 1GS$$

$\phi 1GS$ is the refractive power (the refractive index is the refractive index along the optical axis of the lens) where the lens is a homogeneous lens. $\phi 1GM$ is the refractive power that the medium has due to the fact that the lens has a refractive index distribution, and is expressed by means of the following equation.

$$\phi 1GM = -2N_1 d1 \cdot T1G$$

where;

T1G: core thickness of the GRIN lens used in the first lens unit; and $N_1 d1$: secondary refractive index distribution coefficient of the GRIN lens used in the first lens unit relative to the d-line.

Condition (10) is a condition that must be satisfied by a GRIN lens when it is used in the first lens unit. If the upper limit of condition (10) is exceeded, the refractive index distribution becomes too large, making manufacturing difficult, and higher order aberrations arise, which is undesirable. If the lower limit of condition (10) is exceeded, the negative refractive power of the gradient index lens becomes too large, which increases the refractive power of the surface in the positive direction and makes Petzval sum correction difficult. Correction of various types of aberration, particularly higher order aberrations, also becomes difficult, which is not desirable.

Where the first lens unit comprises a single GRIN lens, it is desirable for said lens to be either a positive lens having a strongly curved convex surface on the object side or a positive meniscus lens with the convex surface on the object side. Because employing either a positive lens with a strongly curved convex surface on the object side or a positive meniscus lens with the convex surface on the object side as the first lens unit allows the spherical aberration and coma aberration occurring in the first lens unit to be reduced, it is particularly desirable from the standpoint of correcting spherical aberration and coma aberration in the longest focal length condition. In addition, because the rear principal point of the first lens unit comes to be located on the front side of the lens in this configuration, the total length of the optical system is also reduced.

Where a GRIN lens is used in the first lens unit, it is desirable for said GRIN lens to satisfy condition (11) set forth below.

$$0.0 < \frac{R_{12} + R_{11}}{R_{12} - R_{11}} < 5.0 \quad (11)$$

where;

$R_{11}$: radius of curvature of the object side surface of the first lens unit; and $R_{12}$: radius of curvature of the image side surface of the first lens unit.

Condition (11) governs the configuration of the GRIN lens where a GRIN lens is used in the first lens unit. If the upper limit of condition (11) is exceeded, spherical aberration in particular tends to tilt toward the positive side in the aberration diagram, which is undesirable. If the lower limit of condition (11) is exceeded, spherical aberration tends to tilt toward the negative side in the aberration diagram, which is also undesirable.

Where a GRIN lens is used in the second lens unit, it is desirable for said GRIN lens to satisfy conditions (12), (13), (14) and (15) set forth below.

In a range defined by 0<H<0.5 H max, $$\frac{d}{dH}\{v_d(H)\} > 0.0 \quad (12)$$

In a range defined by 0<H<H max, $$0.0 \le \frac{v_d(H) - v_d(0)}{v_d(0)} < 2.0 \quad (13)$$

where,

H: height in the direction perpendicular to the optical axis;

H max: maximum value for height in the direction perpendicular to the optical axis (effective aperture);

d/dH: differential symbol; and $v_d(H)$: dispersion of the GRIN lens at a point that is height H away from the optical axis in the direction perpendicular to the optical axis, having a definition identical to that in condition (6).

$$-0.1 < \frac{N_1\lambda 2 - N_1 d2}{\phi 2G^2} < 0.1 \quad (14)$$

where, $N_1 d2$: secondary refractive index distribution coefficient of the GRIN lens used in the second lens unit relative to the d-line;

$N_1\lambda 2$: secondary refractive index distribution coefficient of the GRIN lens used in the second lens unit relative to the C-line and the F-line; and, $\phi 2G$: refractive power of the GRIN lens used in the second lens unit.

$$\left|\frac{N_2 d2}{\phi 2G^4}\right| < 1000 \quad (15)$$

where, $N_2 d2$: quaternary refractive index distribution coefficient of the GRIN lens used in the second lens unit relative to the d-line; and $\phi 2G$: refractive power of the GRIN lens used in the second lens unit.

Where a GRIN lens is used in the second lens unit, the GRIN lens serves to perform correction of various types of aberration (particularly Petzval sum), including correction of chromatic aberration. Said conditions (12) through (15) are conditions regarding dispersion and the refractive index distribution coefficients that must be satisfied by a GRIN lens when it is used in the second lens unit. If the ranges defined by conditions (12), (13) and (14) are exceeded, color correction in the entire optical system becomes extremely difficult due to the chromatic aberration arising in the second lens unit. If the range defined by condition (15) is exceeded, the refractive index distribution becomes too large, making manufacturing difficult, and higher order aberrations also arise, making aberration correction undesirably difficult.

Where a GRIN lens is used in the second lens unit, it is desirable for said GRIN lens to satisfy condition (16) set forth below.

$$0.3 < \frac{\phi 2GM}{\phi 2GS} < 3.0 \quad (16)$$

where, $\phi 2GS$: refractive power of the surface of the GRIN lens used in the second lens unit; and $\phi 2GM$: refractive power of the medium of the GRIN lens used in the second lens unit.

Here, where the refractive power of the GRIN lens used in the second lens unit is deemed $\phi 2G$, $\phi 2GS$ and $\phi 2GM$ are expressed by means of the following equation.

$$\phi 2G = \phi 2GM + \phi 2GS$$

$\phi 2GS$ is the refractive power (the refractive index is the refractive index along the optical axis of the lens) where the lens element is a homogeneous lens. $\phi 2GM$ is the refractive power that the medium has due to the fact that the lens element has refractive index distribution, and is expressed by means of the following equation.

$$\phi 2GM = -2N_1 d2 \cdot T2G$$

where,

T2G: core thickness of the GRIN lens used in the second lens unit; and $N_1 d2$: secondary refractive index distribution coefficient of the GRIN lens used in the second lens unit relative to the d-line.

Condition (16) is a condition that must be satisfied by a GRIN lens when it is used in the second lens unit. If the upper limit of condition (16) is exceeded, the refractive index distribution becomes too large, making manufacturing difficult, and higher order aberrations also arise, which is undesirable. If the lower limit of condition (16) is exceeded, the refractive index distribution becomes too small, making Petzval sum correction difficult, and the aberration correction effect of the refractive index distribution also decreases, making correction of various types of aberration difficult, which is not desirable.

Where a GRIN lens is used in the second lens unit, it is desirable for said GRIN lens to satisfy condition (17) set forth below.

$$-5.0 < \frac{R_{22} + R_{21}}{R_{22} - R_{21}} < 0.0 \tag{17}$$

where, $R_{21}$: radius of curvature of the object side surface of the second lens unit; and $R_{21}$: radius of curvature of the image side surface of the second lens unit.

Condition (17) governs the configuration of the GRIN lens where a GRIN lens is used in the second lens unit. If the upper limit of condition (17) is exceeded, spherical aberration in particular tends to tilt toward the negative side in the aberration diagram, which is undesirable. If the lower limit of condition (17) is exceeded, spherical aberration tends to tilt toward the positive side in the aberration diagram, which is also undesirable. In addition, coma aberration becomes large outside the range defined by condition (17), which is undesirable.

Where the second lens unit comprises a single GRIN lens, it is desirable for said GRIN lens to be either a negative lens having a strongly curved concave surface on the image side or a negative meniscus lens having the concave surface on the image side. Making the GRIN lens either a negative lens having a strongly curved concave surface on the image side or a negative meniscus lens with the concave surface on the image side is desirable because it enables the second lens unit to correct the positive distortion occurring in the first lens unit particularly in the shortest focal length condition and the spherical aberration that occurs in the first lens unit particularly in the longest focal length condition.

Where the second lens unit comprises a GRIN lens and a homogeneous lens, a desirable construction is, from the object side, a negative GRIN lens having a strongly curved concave surface on the image side or a negative meniscus GRIN lens with the concave surface on the image side, and a negative meniscus homogeneous lens with the convex surface on the image side. This construction enables the second lens unit to correct the positive distortion occurring in the first lens unit particularly in the shortest focal length condition and the spherical aberration that occurs in the first lens unit particularly in the longest focal length condition. Moreover, by giving the homogeneous lens a negative refractive power, the refractive index distribution of the GRIN lens may be reduced, making manufacturing easier.

Further, where the second lens unit comprises a GRIN lens and a homogeneous lens, it is desirable for said lens elements to satisfy condition (18) set forth below.

$$0.05 < \frac{\phi 2H}{\phi 2G} < 0.5 \tag{18}$$

where, $\phi 2H$: refractive power of the homogeneous lens used in the second lens unit; and $\phi 2G$: refractive power of the GRIN lens used in the second lens unit.

Condition (18) is a condition that must be satisfied by a GRIN lens and a homogeneous lens where the second lens unit comprises said GRIN lens and said homogeneous lens.

If the upper limit of condition (18) is exceeded, the negative refractive power of the homogeneous lens becomes too large, which increases the variation in dispersion possessed by the GRIN lens for the purpose of chromatic aberration correction, making manufacturing difficulty and even if it is sought to correct the aberration that occurs due to the homogeneous lens using the GRIN lens, correction cannot be carried out sufficiently because of the small refractive index distribution of the GRIN lens, which is undesirable. If the lower limit of condition (18) is exceeded, the refractive index distribution of the GRIN lens becomes too large, making manufacturing difficult, and large higher order aberrations occur, which is undesirable. In addition, by employing an aspherical surface in one of the lens elements of the second lens unit, the freedom in connection with the performance of aberration correction increases, and the number of lens elements in the lens unit may be reduced to the minimum of one while a high magnification and high aperture ratio zoom lens system may be provided, which is desirable. The aspherical surface may be employed on either the GRIN lens or the homogeneous lens.

Where an aspherical surface is employed on one of the lens elements of the second lens unit, it is desirable for said aspherical surface to satisfy condition (19) set forth below.

In a range defined by 0<H<H max, $$-6.0 < \frac{\phi_a - \phi_{0a}}{\phi_2} < 5.0 \tag{19}$$

where, $\phi_a$: local refractive power of the aspherical surface;

$\phi_{0a}$: refractive power based on the standard curvature of the aspherical surface; and $\phi_2$: refractive power of the second lens unit, where $\phi_a$ and $\phi_{0a}$ are expressed by means of the following equations, respectively.

$$\phi_a = Calo(N(H)' - N(H))$$

$$\phi_{0a} = C_0(N_0' - N_0)$$

where,

Calo: local curvature at each height of the aspherical surface;

$C_0$: standard curvature of the aspherical surface;

$N(H)'$: refractive index at each height of the medium on the object side of the aspherical surface;

$N(H)$: refractive index at each height of the medium on the image side of the aspherical surface;

$N_0'$: refractive index along the optical axis of the medium on the object side of the aspherical surface; and $N_0$: refractive index along the optical axis of the medium on the image side of the aspherical surface.

Condition (19) is a condition that must be satisfied by an aspherical surface when it is employed in the second lens unit. If the upper limit of condition (19) is exceeded, the various negative aberrations that occur on account of the spherical surfaces in the lens unit are exacerbated by the presence of the aspherical surface, which is undesirable. If the lower limit of condition (19) is exceeded, correction performed by the aspherical surface becomes excessive, e.g., even where there is more than one aspherical surface, it becomes difficult to offset the excessive correction by means of other aspherical surfaces, which is undesirable.

Where an aspherical surface is employed in one of the lens elements of the second lens unit, making both surfaces of said lens element aspherical increases the degree of freedom resulting from the increase in the number of aspherical surfaces, making the aberration correction effect more pronounced, which is extremely desirable.

Where a GRIN lens is employed in the fourth lens unit, it is desirable for said GRIN lens to satisfy conditions (20) through (24) set forth below.

In a range defined by 0<H<0.5 H max, $$\frac{d}{dH}\{v_d(H)\} < 0.0 \tag{20}$$

In a range defined by 0<H<H max $$-1.0 < \frac{v_d(H) - v_d(0)}{v_d(0)} \le 0.0 \tag{21}$$

where, $v_d(H)$: dispersion of the GRIN lens at a point that is height H away from the optical axis, in the direction perpendicular to the optical axis, having a definition identical to that in condition (6).

$$-0.1 < \frac{N_1\lambda 4 - N_1 d4}{\phi 4G^2} < 0.1 \tag{22}$$

where, $N_1 d4$: secondary refractive index distribution coefficient of the GRIN lens used in the fourth lens unit relative to the d-line;

$N_1\lambda 4$: secondary refractive index distribution coefficient of the GRIN lens used in the fourth lens unit relative to the C-line and the F-line; and, $\phi 4G$: refractive power of the GRIN lens used in the fourth lens unit.

$$-10.0 < \frac{N_1 d4}{\phi 4G^2} < 5.0 \tag{23}$$

$$\left|\frac{N_2 d4}{\phi 4G^4}\right| < 1000 \tag{24}$$

where, $N_1 d4$: secondary refractive index distribution coefficient of the GRIN lens used in the fourth lens unit relative to the d-line;

$N_2 d4$: quaternary refractive index distribution coefficient of the GRIN lens used in the fourth lens unit relative to the d-line; and $\phi 4G$: refractive power of the GRIN lens used in the fourth lens unit.

Where a GRIN lens is used in the fourth lens unit, the GRIN lens serves to perform correction of various types of aberration (particularly higher order aberrations), including correction of chromatic aberration. These conditions are conditions regarding dispersion and the refractive index distribution coefficients that must be satisfied by a GRIN lens when it is used in the fourth lens unit. If the ranges defined by conditions (20), (21) and (22) are exceeded, color correction in the entire optical system becomes extremely difficult due to the chromatic aberration arising in the fourth lens unit. If the ranges defined by conditions (23) and (24) are exceeded, the refractive index distribution becomes too large, making manufacturing difficult, and higher order aberrations also arise, making aberration correction undesirably difficult.

Where a GRIN lens is used in the fourth lens unit, it is desirable for said GRIN lens to satisfy condition (25) set forth below.

$$-0.2 < \frac{\phi 4GM}{\phi 4GS} < 3.0 \tag{25}$$

where, $\phi 4GS$: refractive power of the surface of the GRIN lens used in the fourth lens unit; and $\phi 4GM$: refractive power of the medium of the GRIN lens used in the fourth lens unit.

Here, where the refractive power of the GRIN lens used in the fourth lens unit is deemed $\phi 4G$, $\phi 4GS$ and $\phi 4GM$ are expressed by means of the following equation.

$$\phi 4G = \phi 4GM + \phi 4GS$$

$\phi 4GS$ is the refractive power (the refractive index is the refractive index along the optical axis of the lens) where the lens element is a homogeneous lens. $\phi 4GM$ is the refractive power that the medium has due to the fact that the lens element has a refractive index distribution, and is expressed by means of the following equation.

$$\phi 4GM = -2N_1 d4 \cdot T4G$$

where;

T4G: core thickness of the GRIN lens used in the fourth lens unit; and $N_1 d4$: secondary refractive index distribution coefficient of the GRIN lens used in the fourth lens unit relative to the d-line.

Condition (25) is a condition that must be satisfied by a GRIN lens when it is used in the fourth lens unit. If the upper limit of condition (25) is exceeded, the refractive index distribution becomes too large, making manufacturing difficult, and higher order aberrations also arise, which is undesirable. If the lower limit of condition (25) is exceeded, the negative refractive power possessed by the refractive index distribution becomes too large and the refractive power of the surface increases in the positive direction, making difficult both Petzval sum correction and correction of various types of aberration, particularly higher order aberrations, which is not desirable.

Where a GRIN lens is used in the fourth lens unit, it is desirable for said GRIN lens to satisfy condition (26) set forth below.

$$0.0 < \frac{R_{42} + R_{41}}{R_{42} - R_{41}} < 5.0 \tag{26}$$

where, $R_{41}$: radius of curvature of the object side surface of the fourth lens unit; and $R_{42}$: radius of curvature of the image side surface of the fourth lens unit.

Condition (26) governs the configuration of the GRIN lens where a GRIN lens is used in the fourth lens unit. If the upper limit of condition (26) is exceeded, spherical aberration in particular tends to tilt toward the positive side in the aberration diagram, which is undesirable. If the lower limit of condition (26) is exceeded, spherical aberration tends to tilt toward the negative side in the aberration diagram, which is also undesirable. In addition, coma aberration becomes large outside the range defined by condition (26), which is undesirable.

Where the fourth lens unit comprises a single GRIN lens, it is desirable for said GRIN lens to be either a positive lens having a strongly curved convex surface on the object side or a positive meniscus lens. By making the GRIN lens either a positive lens having a strongly curved convex surface on the object side or a positive meniscus lens, various types of aberration, particularly spherical aberration, may be corrected.

In addition, by employing at least one aspherical surface in one of the lens elements of the fourth lens unit, the freedom in connection with the performance of aberration correction increases, and the number of lens elements in the lens unit may be reduced to the minimum of one while a high magnification and high aperture ratio zoom lens system may be provided.

Where an aspherical surface is employed in one of the lenses in the fourth lens unit, it is desirable for said aspherical surface to satisfy condition (27) set forth below.

In a range defined by 0<H<H max, $$-20.0 < \frac{\phi_a - \phi_{0a}}{\phi_4} < 10.0 \quad (27)$$

where, $\phi_a$: local refractive power of the aspherical surface;

$\phi_{0a}$: refractive power based on the standard curvature of the aspherical surface; and $\phi_4$: refractive power of the fourth lens unit, where $\phi_a$ and $\phi_{0a}$ are expressed by means of the following equations, respectively.

$\phi_a = C alo(N(H)' - N(H))$ $\phi_{0a} = C_0(N_0' - N_0)$ where,

Calo: local curvature at each height of the aspherical surface;

$C_0$: standard curvature of the aspherical surface;

N(H)': refractive index at each height of the medium on the object side of the aspherical surface;

N(H): refractive index at each height of the medium on the image side of the aspherical surface;

$N_0'$: refractive index along the optical axis of the medium on the object side of the aspherical surface; and $N_0$: refractive index along the optical axis of the medium on the image side of the aspherical surface.

Condition (27) is a condition that must be satisfied by an aspherical surface when it is employed in the fourth lens unit. If the upper limit of condition (27) is exceeded, the various aberrations that occur due to the spherical surfaces in the lens unit are exacerbated by the presence of the aspherical surface, which is undesirable. If the lower limit of condition (27) is exceeded, correction performed by the aspherical surface becomes excessive, e.g., even where there is more than one aspherical surface, it becomes difficult to offset the excessive correction by means of other aspherical surfaces, which is undesirable.

In a zoom lens system comprising, from the object side, a first lens unit having a positive refractive power, a second lens unit having a negative refractive power, a third lens unit and a fourth lens unit, where each lens unit comprises a single lens element, it is desirable for at least the first, second and fourth lens units to comprise a GRIN lens.

In a zoom lens system comprising, from the object side, a first lens unit having a positive refractive power, a second lens unit having a negative refractive power, a third lens unit and a fourth lens unit, it is desirable for condition (28) set forth below to be satisfied.

$$0.1 < \left|\frac{\phi_1}{\phi_2}\right| < 0.4 \quad (28)$$

where, $\phi_1$: refractive power of first lens unit; and $\phi_2$: refractive power of second lens unit.

Condition (28) is a condition that must be satisfied by a zoom lens system, and is particularly aimed at allowing compactness and balanced aberration correction in a zoom lens system with a high aperture ratio and high magnification capability. If the upper limit of condition (28) is exceeded, the refractive power of the first lens unit becomes large relative to the refractive power of the second lens unit, and consequently the combined refractive power of the first lens unit and the second lens unit in the shortest focal length condition and the combined refractive power of the second through fourth lens units in the longest focal length condition become small, increasing the length of the optical system, which is undesirable. If the lower limit of condition (28) is exceeded, the refractive power of the second lens unit becomes too large, which makes aberration correction difficult, which is undesirable.

Numerical examples for the zoom lens system pertaining to the present invention are provided below with reference to construction data and aberration drawings.

Numerical examples 1 through 4 provided below correspond to the embodiments described above, respectively. In each numerical example, ri (i=1,2,3, . . . ) represents the radius of curvature of ith surface ri counted from the object side, di (i=1,2,3, . . . ) represents the ith axial distance counted from the object side, and Ndi (i=1,2,3, . . . ) and vi (i=1,2,3, . . . ) represent the refractive index relative to the d-line and the Abbe number of the ith lens counted from the object side, respectively. In each embodiment, the lens having a medium as to which GRIN i (i=1,2,3, . . . ) is indicated under the Nd column is a gradient index lens, and its refractive index distribution is defined using glass data Ni (i=0,1,2,3 . . . ) based on equation (1).

Further, in each numerical example, the surface marked with an asterisk in the radius of curvature column is an aspherical surface, and is defined by means of the equation set forth below that expresses the configuration of an aspherical surface.

$$x(H) = \frac{c \cdot H^2}{1 + \sqrt{1 - \varepsilon \cdot c^2 \cdot H^2}} + \sum_{i \geq 2} A_i \cdot H^i$$

where,

H: height in the direction perpendicular to the optical axis;

x(H): deviation from the reference plane in the direction of the optical axis;

c: paraxial curvature;

$\varepsilon$: quadric surface parameter; and

Ai: ith aspherical surface coefficient.

Values for focal length f of the entire optical system, angle of view 2, F-number F no and the air distance (axial distance) between the lens units are shown from the left with regard to the shortest focal length condition (W), middle focal length condition (M) and longest focal length condition (T), in that order.

FIGS. 5, 8, 11 and 14 show aberrations in the shortest focal length condition for numerical examples 1 through 4, respectively. FIGS. 6, 9, 12 and 15 show aberrations in the middle focal length condition for numerical examples 1 through 4, respectively. FIGS. 7, 10, 13 and 16 show aberrations in the longest focal length condition for numerical examples 1 through 4, respectively In said FIGS. 5 through 16, the drawings under 'A' show spherical aberration and sine condition. Solid line (d) represents the spherical aberration relative to the d-line, chain line (g) represents the spherical aberration relative to the g-line, two-dot chain line (c) represents the spherical aberration relative to the c-line, and dotted line (SC) represents the unsatisfied amount of the sine condition. The drawings under 'B' show the degree of astigmatism. Dotted line (DM) and solid line (DS) represent the astigmatism relative to the d-line on the meridional plane and the sagital plane, respectively. The drawings under 'C' show the degree of distortion.

Further, tables 5 through 8 show the values for the conditions regarding embodiments 1 through 4.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

TABLE 1

(1st Embodiment)
f = 4.500 mm to 12.148 mm to 25.659 mm
2 ω =0 57.7° to 21.8° to 10.3°
Fno. = 1.85 to 2.14 to 2.65

| | Radius of Curvature | Axial Distance | Refractive Index | | Abbe number |
|---|---|---|---|---|---|
| r1 | 11.745 | | | | |
| r2 | −178.442 | d2 | GRIN 1 | | |
| r3 | 29.150 | d2 | 0.766 to 5.449 to 8.196 | | |
| r4 | 3.445 | d3 | Nd2 | 1.88300 v1 | 40.80 |
| r5 | −6.062 | d4 | | | |
| r6 | 5.071 | d5 | Nd3 | 1.51742 v2 | 52.41 |
| r7 | 81.678 | d6 | Nd4 | 1.84666 v3 | 23.82 |
| r8* | 8.633 | d7 | 9.412 to 4.684 to 1.936 | | |
| r9 | −44.710 | d8 | Nd5 | 1.58913 v4 | 61.20 |
| r10 | 15.000 | d9 | 3.738 to 1.936 to 3.738 | | |
| r11* | −18.000 | d10 | GRIN 2 | | |
| r12 | ∞ | d11 | 3.740 to 5.629 to 3.780 | | |
| r13 | ∞ | d12 | Nd6 | 1.51633 v6 | 64.15 |

Aspherical Coefficient

| r8* | ε | 1.0000000 |
| | A4 | −0.46512131 × 10⁻³ |
| | A6 | −0.34919892 × 10⁻⁵ |
| | A8 | −0.14125092 × 10⁻⁶ |
| r11* | ε | 1.0000000 |
| | A4 | 0.18001508 × 10⁻³ |
| | A6 | 0.15624251 × 10⁻³ |
| | A8 | −0.51356139 × 10⁻³ |
| | A10 | −0.15392107 × 10⁻³ |
| | A12 | 0.40034835 × 10⁻³ |

Refractive Index Distribution Coefficient

GRIN 1

| | d-line | C-line | F-line |
|---|---|---|---|
| N0 | 1.6700 | 1.66643 | 1.67817 |
| N1 | −0.51253021 × 10⁻³ | −0.55539552 × 10⁻³ | −0.41609043 × 10⁻³ |

TABLE 1-continued (1st Embodiment)
f = 4.500 mm to 12.148 mm to 25.659 mm
2 ω =0 57.7° to 21.8° to 10.3°
Fno. = 1.85 to 2.14 to 2.65

| N2 | 0.50582764 × 10⁻⁵ | 0.36305310 × 10⁻⁵ | 0.80054236 × 10⁻⁵ |
| N3 | −0.20278725 × 10⁻⁸ | 0.61524970 × 10⁻⁷ | −0.32179303 × 10⁻⁷ |
| N4 | 0.49111805 × 10⁻⁸ | 0.26980414 × 10⁻⁸ | 0.68332470 × 10⁻⁸ |

GRIN 2

| | d-line | C-line | F-line |
|---|---|---|---|
| N0 | 1.58913 | 1.58619 | 1.59583 |
| N1 | −0.14566929 × 10⁻³ | −0.28956967 × 10⁻³ | 0.16960954 × 10⁻³ |
| N2 | −0.26142819 × 10⁻³ | −0.26341570 × 10⁻³ | −0.26230053 × 10⁻³ |
| N3 | −0.35515380 × 10⁻⁴ | −0.34787781 × 10⁻⁴ | −0.34296654 × 10⁻⁴ |
| N4 | 0.21734068 × 10⁻⁶ | 0.17954910 × 10⁻⁶ | 0.93869083 × 10⁻⁷ |

TABLE 2

(2nd Embodiment)
f = 4.500 mm to 12.112 mm to 25.729 mm
2 ω =0 56.4° to 22.4° to 10.2°
Fno. = 1.85 to 2.14 to 2.65

| | Radius of Curvature | Axial Distance | Refractive Index | | Abbe number |
|---|---|---|---|---|---|
| r1 | 11.002 | d1 | 3.85 | GRIN 1 | |
| r2 | −149.213 | d2 | 0.970 to 4.821 to 7.500 | | |
| r3* | −23.030 | d3 | 1.41 | GIRN 2 | |
| r4* | 4.585 | d4 | 7.629 to 5.027 to 4.901 | | |
| r5* | 6.187 | d5 | 0.37 | Nd3 1.58913 v3 | 61.11 |
| r6 | 14.452 | d6 | 4.994 to 2.484 to 4.200 | | |
| r7 | −21.257 | d7 | 3.00 | GRIN 3 | |
| r8* | 8.633 | d8 | 5.854 to 7.115 to 2.848 | | |
| r9 | ∞ | d9 | 4.87 | | |
| r10 | ∞ | | | | |

Aspherical Coefficient

| r3* | ε | 1.00000000 |
| | A4 | 0.68893996 × 10⁻² |
| | A6 | −0.65904405 × 10⁻³ |
| | A8 | 0.87841613 × 10⁻⁴ |
| | A10 | −0.75750947 × 10⁻⁵ |
| | A12 | 0.25629608 × 10⁻⁶ |
| r4* | ε | 1.00000000 |
| | A4 | 0.13057767 × 10⁻¹ |
| | A6 | 0.32443077 × 10⁻³ |
| | A8 | 0.51156861 × 10⁻⁴ |
| | A10 | 0.57644150 × 10⁻⁵ |
| | A12 | 0.33781420 × 10⁻¹³ |
| r5* | ε | 1.00000000 |
| | A4 | −0.83356750 × 10⁻³ |
| | A6 | −0.14953276 × 10⁻⁵ |
| | A8 | −0.23157028 × 10⁻⁵ |
| | A10 | 0.23280115 × 10⁻⁶ |
| | A12 | −0.80718770 × 10⁻⁸ |
| r8* | ε | 1.00000000 |
| | A4 | 0.17822485 × 10⁻² |
| | A6 | 0.11593314 × 10⁻³ |
| | A8 | 0.15533559 × 10⁻⁴ |
| | A10 | −0.19557050 × 10⁻⁵ |
| | A12 | 0.14931079 × 10⁻⁶ |

Refractive Index Distribution Coefficient

GRIN 1

| | d-line | C-line | F-line |
|---|---|---|---|
| N0 | 1.67000 | 1.66643 | 1.67817 |
| N1 | 0.10894666 × 10⁻⁶ | −0.11198625 × 10⁻² | −0.98473217 × 10⁻³ |
| N2 | 0.21831525 × 10⁻⁶ | 0.19413975 × 10⁻⁵ | 0.19000960 × 10⁻⁵ |
| N3 | −0.33361081 × 10⁻⁶ | 0.17758956 × 10⁻⁷ | −0.41926023 × 10⁻⁷ |
| N4 | 0.83160558 × 10⁻⁶ | −0.37639686 × 10⁻⁹ | 0.23679140 × 10⁻⁸ |

TABLE 2-continued (2nd Embodiment)
f = 4.500 mm to 12.112 mm to 25.729 mm
2 ω =0 56.4° to 22.4° to 10.2°
Fno. = 1.85 to 2.14 to 2.65

GRIN 2

|    | d-line | C-line | F-line |
|----|--------|--------|--------|
| N0 | 1.68893 | 1.68250 | 1.70461 |
| N1 | $0.49769585 \times 10^{-1}$ | $0.49795836 \times 10^{-1}$ | $0.48653955 \times 10^{-1}$ |
| N2 | $0.35699221 \times 10^{-2}$ | $0.37962331 \times 10^{-2}$ | $0.40143207 \times 10^{-2}$ |
| N3 | $0.71090048 \times 10^{-5}$ | $-0.68595756 \times 10^{-4}$ | $-0.79843089 \times 10^{-4}$ |
| N4 | $0.10814593 \times 10^{-4}$ | $0.17166182 \times 10^{-4}$ | $0.17795145 \times 10^{-4}$ |

GRIN 3

|    | d-line | C-line | F-line |
|----|--------|--------|--------|
| N0 | 1.58913 | 1.58619 | 1.59583 |
| N1 | $-0.35705664 \times 10^{-2}$ | $-0.36670919 \times 10^{-2}$ | $-0.33349247 \times 10^{-2}$ |
| N2 | $-0.23657222 \times 10^{-3}$ | $-0.23947241 \times 10^{-3}$ | $-0.23415489 \times 10^{-3}$ |
| N3 | $-0.32288937 \times 10^{-4}$ | $-0.32526077 \times 10^{-4}$ | $-0.32315234 \times 10^{-4}$ |
| N4 | $-0.76522346 \times 10^{-6}$ | $-0.72762479 \times 10^{-6}$ | $-0.79543365 \times 10^{-6}$ |

TABLE 3

(3rd Embodiment)
f = 4.501 mm to 12.112 mm to 25.728 mm
2 ω =0 56.2° to 22.1° to 10.0°
Fno. = 1.85 to 2.14 to 2.65

|      | Radius of Curvature | Axial Distance | Refractive Index | Abbe number |
|------|---------------------|----------------|------------------|-------------|
| r1   | 14.865  | d1  | 4.49  |        |        | GRIN 1 |       |
| r2   | -348.537 | d2 | 1.905 to 7.017 to 10.554 |   |    |     |       |
| r3*  | -80.742 | d3  | 0.91  |        |        | GIRN 2 |       |
| r4*  | 6.011   | d4  | 1.48  |        |        |        |       |
| r5   | -3.260  | d5  | 1.00  | Nd3    | 1.84666 | v3    | 23.82 |
| r6   | -4.214  | d6  | 7.710 to 3.087 to 1.087 |    |    |     |       |
| r7*  | 5.595   | d7  | 3.89  | Nd4    | 1.58913 | v4    | 61.11 |
| r8   | 11.316  | d8  | 2.375 to 1.146 to 2.318 |    |    |     |       |
| r9   | 7.106   | d9  | 3.16  |        |        | GRIN 3 |       |
| r10* | -34.911 | d10 | 3.323 to 4.320 to 1.500 |   |    |     |       |
| r11  | ∞       | d11 | 4.87  | Nd5    | 1.51680 | v5    | 64.20 |
| r12  | ∞       |     |       |        |        |        |       |

Aspherical Coefficient

| r3*  | ε   | 1.00000000 |
|------|-----|------------|
|      | A4  | $0.61417925 \times 10^{-2}$ |
|      | A6  | $-0.50444975 \times 10^{-2}$ |
|      | A8  | $0.68427535 \times 10^{-2}$ |
|      | A10 | $-0.63175161 \times 10^{-2}$ |
|      | A12 | $0.28373610 \times 10^{-2}$ |
| r4*  | ε   | 1.00000000 |
|      | A4  | $-0.69920243 \times 10^{-2}$ |
|      | A6  | $0.18619408 \times 10^{-3}$ |
|      | A8  | $0.29784475 \times 10^{-4}$ |
|      | A10 | $-0.16473410 \times 10^{-5}$ |
|      | A12 | $0.33109590 \times 10^{-13}$ |
| r7*  | ε   | 1.00000000 |
|      | A4  | $-0.68187728 \times 10^{-3}$ |
|      | A6  | $0.54858446 \times 10^{-5}$ |
|      | A8  | $-0.27204181 \times 10^{-5}$ |
|      | A10 | $0.19635593 \times 10^{-6}$ |
|      | A12 | $-0.58699277 \times 10^{-8}$ |
| r10* | ε   | 1.00000000 |
|      | A4  | $0.14826166 \times 10^{-2}$ |
|      | A6  | $0.10926023 \times 10^{-3}$ |
|      | A8  | $0.20970038 \times 10^{-4}$ |
|      | A10 | $-0.27455275 \times 10^{-5}$ |
|      | A12 | $0.17002255 \times 10^{-6}$ |

TABLE 3-continued (3rd Embodiment)
f = 4.501 mm to 12.112 mm to 25.728 mm
2 ω =0 56.2° to 22.1° to 10.0°
Fno. = 1.85 to 2.14 to 2.65

Refractive Index Distribution Coefficient

GRIN 1

|    | d-line | C-line | F-line |
|----|--------|--------|--------|
| N0 | 1.67000 | 1.66643 | 1.67817 |
| N1 | $-0.9961345 \times 10^{-3}$ | $-0.97309406 \times 10^{-3}$ | $-0.88183116 \times 10^{-3}$ |
| N2 | $-0.34463680 \times 10^{-5}$ | $-0.43971060 \times 10^{-5}$ | $-0.31269387 \times 10^{-5}$ |
| N3 | $-0.19855915 \times 10^{-7}$ | $0.64462676 \times 10^{-8}$ | $-0.74572542 \times 10^{-9}$ |
| N4 | $-0.53326538 \times 10^{-9}$ | $-0.93441234 \times 10^{-9}$ | $-0.63602456 \times 10^{-9}$ |

GRIN 2

|    | d-line | C-line | F-line |
|----|--------|--------|--------|
| N0 | 1.68893 | 1.68250 | 1.70461 |
| N1 | $0.50929027 \times 10^{-1}$ | $0.51203062 \times 10^{-1}$ | $0.49522319 \times 10^{-1}$ |
| N2 | $0.42375112 \times 10^{-2}$ | $0.43670081 \times 10^{-2}$ | $0.46718483 \times 10^{-2}$ |
| N3 | $-0.46942128 \times 10^{-4}$ | $-0.10762630 \times 10^{-3}$ | $-0.12318123 \times 10^{-3}$ |
| N4 | $0.14167260 \times 10^{-4}$ | $0.19782718 \times 10^{-4}$ | $0.20098723 \times 10^{-4}$ |

GRIN 3

|    | d-line | C-line | F-line |
|----|--------|--------|--------|
| N0 | 1.58913 | 1.58619 | 1.59583 |
| N1 | $-0.44158993 \times 10^{-2}$ | $-0.45484440 \times 10^{-2}$ | $-0.414554239 \times 10^{-2}$ |
| N2 | $-0.84901450 \times 10^{-4}$ | $-0.85163482 \times 10^{-4}$ | $-0.780744839 \times 10^{-4}$ |
| N3 | $-0.23960818 \times 10^{-4}$ | $-0.24296569 \times 10^{-4}$ | $-0.23530474 \times 10^{-4}$ |
| N4 | $-0.42936106 \times 10^{-6}$ | $-0.41112842 \times 10^{-6}$ | $-0.46871301 \times 10^{-6}$ |

TABLE 4

(4th Embodiment)
f = 4.500 mm to 12.113 mm to 25.730 mm
2 ω =0 56.8° to 22.6° to 10.5°
Fno. = 1.85 to 2.14 to 2.25

|      | Radius of Curvature | Axial Distance | Refractive Index | Abbe number |
|------|---------------------|----------------|------------------|-------------|
| r1   | 14.520  | d1  | 4.69  |        |        | GRIN 1 |       |
| r2   | 977.641 | d2  | 1.245 to 6.933 to 11.498 |    |    |     |       |
| r3*  | 67.833  | d3  | 1.00  |        |        | GIRN 2 |       |
| r4*  | 8.457   | d4  | 2.74  |        |        |        |       |
| r5   | -2.457  | d5  | 1.00  | Nd3    | 1.84666 | v3    | 23.82 |
| r6   | -3.905  | d6  | 6.589 to 1.555 to 1.001 |    |    |     |       |
| r7*  | 5.140   | d7  | 1.91  | Nd4    | 1.58913 | v4    | 61.11 |
| r8   | 6.940   | d8  | 2.590 to 1.196 to 0.800 |    |    |     |       |
| r9   | 16.527  | d9  | 4.59  |        |        | GRIN 3 |       |
| r10* | -35.747 | d10 | 2.985 to 3.742 to 0.800 |    |    |     |       |
| r11  | ∞       | d11 | 4.87  | Nd5    | 1.51680 | v5    | 64.20 |
| r12  | ∞       |     |       |        |        |        |       |

Aspherical Coefficient

| r3*  | ε   | 1.00000000 |
|------|-----|------------|
|      | A4  | $0.43386917 \times 10^{-2}$ |
|      | A6  | $-0.62914929 \times 10^{-3}$ |
|      | A8  | $0.51581900 \times 10^{-4}$ |
|      | A10 | $-0.26361951 \times 10^{-5}$ |
|      | A12 | $0.46559936 \times 10^{-7}$ |
| r4*  | ε   | 1.00000000 |
|      | A4  | $-0.38853679 \times 10^{-3}$ |
|      | A6  | $0.46112493 \times 10^{-4}$ |
|      | A8  | $-0.31117338 \times 10^{-6}$ |
|      | A10 | $-0.14810607 \times 10^{-8}$ |
|      | A12 | $-0.19957806 \times 10^{-9}$ |
| r7*  | ε   | 1.00000000 |
|      | A4  | $-0.72843901 \times 10^{-3}$ |
|      | A6  | $-0.12002761 \times 10^{-4}$ |
|      | A8  | $-0.81842888 \times 10^{-4}$ |
|      | A10 | $0.87439986 \times 10^{-5}$ |
|      | A12 | $-0.77493852 \times 10^{-7}$ |

TABLE 4-continued (4th Embodiment)
f = 4.500 mm to 12.113 mm to 25.730 mm
2ω = 56.8° to 22.6° to 10.5°
Fno. = 1.85 to 2.14 to 2.25

| r10* | ε | 1.00000000 |
| | A4 | $0.56655553 \times 10^{-3}$ |
| | A6 | $-0.30453498 \times 10^{-4}$ |
| | A8 | $0.14011808 \times 10^{-4}$ |
| | A10 | $-0.11367310 \times 10^{-5}$ |
| | A12 | $0.46930707 \times 10^{-7}$ |

Refractive Index Distribution Coefficient

GRIN 1

| | d-line | C-line | F-line |
|---|---|---|---|
| N0 | 1.67000 | 1.66643 | 1.67817 |
| N1 | $-0.55585776 \times 10^{-3}$ | $-0.57893180 \times 10^{-3}$ | $-0.49848292 \times 10^{-3}$ |
| N2 | $-0.39394173 \times 10^{-6}$ | $-0.87378843 \times 10^{-6}$ | $0.40149891 \times 10^{-6}$ |
| N3 | $0.23462828 \times 10^{-9}$ | $0.67010116 \times 10^{-8}$ | $-0.64815582 \times 10^{-8}$ |
| N4 | $-0.23593793 \times 10^{-10}$ | $-0.14260186 \times 10^{-9}$ | $0.18418972 \times 10^{-9}$ |

GRIN 2

| | d-line | C-line | F-line |
|---|---|---|---|
| N0 | 1.68893 | 1.68250 | 1.70461 |
| N1 | $0.47802222 \times 10^{-1}$ | $0.48053959 \times 10^{-1}$ | $0.47072146 \times 10^{-1}$ |
| N2 | $0.27156145 \times 10^{-2}$ | $0.26814530 \times 10^{-2}$ | $0.28480555 \times 10^{-2}$ |
| N3 | $-0.48186925 \times 10^{-3}$ | $-0.47749617 \times 10^{-3}$ | $-0.50256324 \times 10^{-3}$ |
| N4 | $0.91074031 \times 10^{-5}$ | $0.89436880 \times 10^{-5}$ | $0.10232814 \times 10^{-4}$ |

GRIN 3

| | d-line | C-line | F-line |
|---|---|---|---|
| N0 | 1.58913 | 1.58619 | 1.59583 |
| N1 | $-0.10429069 \times 10^{-1}$ | $-0.10469547 \times 10^{-1}$ | $-0.10349043 \times 10^{-1}$ |
| N2 | $-0.62919515 \times 10^{-4}$ | $-0.62408155 \times 10^{-4}$ | $-0.60786758 \times 10^{-4}$ |
| N3 | $-0.24731128 \times 10^{-5}$ | $-0.25792945 \times 10^{-5}$ | $-0.25831767 \times 10^{-5}$ |
| N4 | $-0.12098623 \times 10^{-6}$ | $-0.11540241 \times 10^{-6}$ | $-0.12153177 \times 10^{-6}$ |

TABLE 5

(1st embodiment)

Entire zone lens system

| Condition (29) $\left|\frac{\phi_1}{\phi_2}\right|$ | 0.240 |
|---|---|

First lens unit (Gradient index lens G1)

| Condition (2) $\operatorname{sgn}(\phi 1) \cdot \frac{N_1 d1}{\phi 1^2}$ | 0.127 |
|---|---|
| Condition (8) $\frac{N_1 d1}{\phi 1 G^2}$ | −0.127 |
| Condition (8) $\left|\frac{N_2 d1}{\phi 1 G^4}\right|$ | 0.008 |
| Condition (7) $\frac{N_1 F1 - N_1 d1}{\phi 1 G^2}$ | 0.024 |
| Condition (7) $\frac{N_1 C1 - N_1 d1}{\phi 1 G^2}$ | −0.011 |
| Condition (10) $\frac{\phi 1 GM}{\phi 1 GS}$ | 0.055 |
| Condition (11) $\frac{R_{12} + R_{11}}{R_{12} - R_{11}}$ | 0.876 |

TABLE 5-continued (1st embodiment)

| Condition (5) $\frac{v_d(H) - v_d(0)}{v_d(0)}$ | |
|---|---|
| 0.0H max | 0.000 |
| 0.1H max | −0.004 |
| 0.2H max | −0.015 |
| 0.3H max | −0.033 |
| 0.4H max | −0.058 |
| 0.5H max | −0.090 |
| 0.6H max | −0.129 |
| 0.7H max | −0.175 |
| 0.8H max | −0.229 |
| 0.9H max | −0.292 |
| 1.0H max | −0.356 |

Fourth lens unit (Gradient index lens G6)

| Condition (2) $\operatorname{sgn}(\phi 4) \cdot \frac{N_1 d4}{\phi 4^2}$ | 0.029 |
|---|---|
| Condition (23) $\frac{N_1 d4}{\phi 4 G^2}$ | −0.029 |
| Condition (24) $\left|\frac{N_2 d4}{\phi 4 G^4}\right|$ | 10.584 |
| Condition (22) $\frac{N_1 F4 - N_1 d4}{\phi 4 G^2}$ | 0.063 |
| Condition (22) $\frac{N_1 C4 - N_1 d4}{\phi 4 G^2}$ | −0.029 |
| Condition (25) $\frac{\phi 4 GM}{\phi 4 GS}$ | 0.091 |
| Condition (26) $\frac{R_{42} + R_{41}}{R_{42} - R_{41}}$ | 0.012 |

| | Condition (21) $\frac{v_d(H) - v_d(0)}{v_d(0)}$ | Condition (27) $\frac{\phi_a - \phi_{0a}}{\phi 4}$ (r11) |
|---|---|---|
| 0.0H max | 0.000 | 0.000 |
| 0.1H max | −0.005 | −0.017 |
| 0.2H max | −0.018 | −0.070 |
| 0.3H max | −0.040 | −0.171 |
| 0.4H max | −0.070 | −0.338 |
| 0.5H max | −0.107 | −0.595 |
| 0.6H max | −0.150 | −0.979 |
| 0.7H max | −0.199 | −1.541 |
| 0.8H max | −0.253 | −2.375 |
| 0.9H max | −0.310 | −3.621 |
| 1.0H max | −0.370 | −5.309 |

TABLE 6

(2nd embodiment)

Entire zoom lens system

| | |
|---|---|
| Condition (29) $\left|\dfrac{\phi_1}{\phi_2}\right|$ | 0.215 |

First lens unit (Gradient index lens is G1)

| | |
|---|---|
| Condition (2) $\text{sgn}(\phi 1) \cdot \dfrac{N_1 d1}{\phi 1^2}$ | 0.207 |
| Condition (8) $\dfrac{N_1 d1}{\phi 1 G^2}$ | −0.207 |
| Condition (8) $\left|\dfrac{N_2 d1}{\phi 1 G^4}\right|$ | 0.008 |
| Condition (7) $\dfrac{N_1 F1 - N_1 d1}{\phi 1 G^2}$ | 0.020 |
| Condition (7) $\dfrac{N_1 C1 - N_1 d1}{\phi 1 G^2}$ | −0.006 |
| Condition (10) $\dfrac{\phi 1 GM}{\phi 1 GS}$ | 0.131 |
| Condition (11) $\dfrac{R_{12} + R_{11}}{R_{12} - R_{11}}$ | 0.863 |

| | Condition (5) $\dfrac{v_d(H) - v_d(0)}{v_d(0)}$ |
|---|---|
| 0.0H max | 0.000 |
| 0.1H max | −0.005 |
| 0.2H max | −0.019 |
| 0.3H max | −0.044 |
| 0.4H max | −0.080 |
| 0.5H max | −0.126 |
| 0.6H max | −0.184 |
| 0.7H max | −0.253 |
| 0.8H max | −0.333 |
| 0.9H max | −0.425 |
| 1.0H max | −0.528 |

Second lens unit (Gradient index lens G2)

| | |
|---|---|
| Condition (2) $\text{sgn}(\phi 2) \cdot \dfrac{N_1 d2}{\phi 2^2}$ | 0.436 |
| Condition (3) $\dfrac{N_1 d2}{\phi 2^2}$ | 0.436 |
| Condition (15) $\left|\dfrac{N_2 d2}{\phi 2 G^4}\right|$ | 0.274 |
| Condition (14) $\dfrac{N_1 F2 - N_1 d2}{\phi 2 G^2}$ | −0.010 |
| Condition (14) $\dfrac{N_1 C2 - N_1 d2}{\phi 2 G^2}$ | 0.000 |
| Condition (16) $\dfrac{\phi 2 GM}{\phi 2 GS}$ | 0.711 |
| Condition (17) $\dfrac{R_{22} + R_{21}}{R_{22} - R_{21}}$ | −0.668 |

TABLE 6-continued (2nd embodiment)

| | Condition (13) $\dfrac{v_d(H) - v_d(0)}{v_d(0)}$ | Condition (19) $\dfrac{\phi_a - \phi_{0a}}{\phi 2}$ | |
|---|---|---|---|
| | | (r3) | (r4) |
| 0.0H max | 0.000 | 0.000 | −0.000 |
| 0.1H max | 0.010 | −0.013 | −0.015 |
| 0.2H max | 0.039 | −0.048 | −0.059 |
| 0.3H max | 0.088 | −0.103 | −0.129 |
| 0.4H max | 0.157 | −0.172 | −0.220 |
| 0.5H max | 0.245 | −0.255 | −0.326 |
| 0.6H max | 0.350 | −0.356 | −0.442 |
| 0.7H max | 0.469 | −0.476 | −0.560 |
| 0.8H max | 0.595 | −0.602 | −0.678 |
| 0.9H max | 0.720 | −0.703 | −0.817 |
| 1.0H max | 0.832 | −0.782 | −1.056 |

Fourth lens unit (Gradient index lens G4)

| | |
|---|---|
| Condition (2) $\text{sgn}(\phi 4) \cdot \dfrac{N_1 d4}{\phi 4^2}$ | 0.263 |
| Condition (23) $\dfrac{N_1 d4}{\phi 4 G^2}$ | −0.263 |
| Condition (24) $\left|\dfrac{N_2 d4}{\phi 4 G^4}\right|$ | 1.281 |
| Condition (22) $\dfrac{N_1 F4 - N_1 d4}{\phi 4 G^2}$ | 0.017 |
| Condition (22) $\dfrac{N_1 C4 - N_1 d4}{\phi 4 G^2}$ | −0.007 |
| Condition (25) $\dfrac{\phi 4 GM}{\phi 4 GS}$ | 0.225 |
| Condition (26) $\dfrac{R_{42} + R_{41}}{R_{42} - R_{41}}$ | 0.091 |

| | Condition (21) $\dfrac{v_d(H) - v_d(0)}{v_d(0)}$ | Condition (17) $\dfrac{\phi_a - \phi_{0a}}{\phi 4}$ (r8) |
|---|---|---|
| 0.0H max | 0.000 | 0.000 |
| 0.1H max | −0.004 | −0.010 |
| 0.2H max | −0.016 | −0.042 |
| 0.3H max | −0.035 | −0.101 |
| 0.4H max | −0.061 | −0.201 |
| 0.5H max | −0.095 | −0.361 |
| 0.6H max | −0.137 | −0.609 |
| 0.7H max | −0.185 | −0.991 |
| 0.8H max | −0.240 | −1.595 |

TABLE 6-continued (2nd embodiment)

| | | |
|---|---|---|
| 0.9H max | −0.302 | −2.581 |
| 1.0H max | −0.370 | −3.685 |

TABLE 7

(3rd embodiment)

Entire zone lens system

| | |
|---|---|
| Condition (29) $\left|\dfrac{\phi_1}{\phi_2}\right|$ | 0.231 |

First lens unit (Gradient index lens is G1)

| | |
|---|---|
| Condition (2) $\text{sgn}(\phi 1) \cdot \dfrac{N_1 d1}{\phi 1^2}$ | 0.317 |
| Condition (8) $\dfrac{N_1 d1}{\phi 1 G^2}$ | −0.317 |
| Condition (8) $\left|\dfrac{N_2 d1}{\phi 1 G^4}\right|$ | 0.384 |
| Condition (7) $\dfrac{N_1 F1 - N_1 d1}{\phi 1 G^2}$ | 0.023 |
| Condition (7) $\dfrac{N_1 C1 - N_1 d1}{\phi 1 G^2}$ | −0.008 |
| Condition (10) $\dfrac{\phi 1 GM}{\phi 1 GS}$ | 0.185 |
| Condition (11) $\dfrac{R_{12} + R_{11}}{R_{12} - R_{11}}$ | 0.918 |

| | Condition (5) $\dfrac{v_d(H) - v_d(0)}{v_d(0)}$ |
|---|---|
| 0.0H max | 0.000 |
| 0.1H max | −0.005 |
| 0.2H max | −0.019 |
| 0.3H max | −0.044 |
| 0.4H max | −0.078 |
| 0.5H max | −0.123 |
| 0.6H max | −0.178 |
| 0.7H max | −0.243 |
| 0.8H max | −0.318 |
| 0.9H max | −0.402 |
| 1.0H max | −0.496 |

Second lens unit (Gradient index lens G2)

| | |
|---|---|
| Condition (2) $\text{sgn}(\phi 2) \cdot \dfrac{N_1 d2}{\phi 2^2}$ | 0.904 |
| Condition (3) $\dfrac{N_1 d2}{\phi 2^2}$ | −0.904 |
| Condition (15) $\left|\dfrac{N_2 d2}{\phi 2 G^4}\right|$ | 1.336 |
| Condition (14) $\dfrac{N_1 F2 - N_1 d2}{\phi 2 G^2}$ | −0.025 |
| Condition (14) $\dfrac{N_1 C2 - N_1 d2}{\phi 2 G^2}$ | 0.005 |

TABLE 7-continued (3rd embodiment)

| | |
|---|---|
| Condition (16) $\dfrac{\phi 2 GM}{\phi 2 GS}$ | 0.637 |
| Condition (17) $\dfrac{R_{22} + R_{21}}{R_{22} - R_{21}}$ | −0.861 |
| Condition (18) $\dfrac{\phi 2H}{\phi 2G}$ | 0.139 |

| | Condition (13) $\dfrac{v_d(H) - v_d(0)}{v_d(0)}$ | Condition (19) $\dfrac{\phi_a - \phi_{0a}}{\phi 2}$ | |
|---|---|---|---|
| | | (r3) | (r4) |
| 0.0H max | 0.000 | 0.000 | −0.000 |
| 0.1H max | 0.010 | −0.014 | −0.009 |
| 0.2H max | 0.041 | −0.055 | −0.036 |
| 0.3H max | 0.092 | −0.120 | −0.080 |
| 0.4H max | 0.165 | −0.206 | −0.137 |
| 0.5H max | 0.259 | −0.312 | −0.206 |
| 0.6H max | 0.371 | −0.443 | −0.279 |
| 0.7H max | 0.499 | −0.606 | −0.348 |
| 0.8H max | 0.637 | −0.812 | −0.400 |
| 0.9H max | 0.784 | −1.090 | −0.417 |
| 1.0H max | 0.941 | −1.549 | −0.372 |

Fourth lens unit (Gradient index lens G5)

| | |
|---|---|
| Condition (2) $\text{sgn}(\phi 4) \cdot \dfrac{N_1 d4}{\phi 4^2}$ | 0.297 |
| Condition (23) $\dfrac{N_1 d4}{\phi 4 G^2}$ | 0.297 |
| Condition (24) $\left|\dfrac{N_2 d4}{\phi 4 G^4}\right|$ | 0.384 |
| Condition (22) $\dfrac{N_1 F4 - N_1 d4}{\phi 4 G^2}$ | 0.018 |
| Condition (22) $\dfrac{N_1 C4 - N_1 d4}{\phi 4 G^2}$ | −0.009 |
| Condition (25) $\dfrac{\phi 4 GM}{\phi 4 GS}$ | 0.297 |
| Condition (26) $\dfrac{R_{42} + R_{41}}{R_{42} - R_{41}}$ | 0.662 |

| | Condition (21) $\dfrac{v_d(H) - v_d(0)}{v_d(0)}$ | Condition (27) $\dfrac{\phi_a - \phi_{0a}}{\phi 4}$ (r10) |
|---|---|---|
| 0.0H max | 0.000 | 1.102 |
| 0.1H max | −0.006 | 1.090 |

TABLE 7-continued (3rd embodiment)

| | | |
|---|---|---|
| 0.2H max | −0.025 | 1.048 |
| 0.3H max | −0.056 | 0.953 |
| 0.4H max | −0.098 | 0.747 |
| 0.5H max | −0.151 | 0.321 |
| 0.6H max | −0.213 | −0.540 |
| 0.7H max | −0.284 | −2.364 |
| 0.8H max | −0.363 | −6.476 |
| 0.9H max | −0.448 | −12.567 |
| 1.0H max | −0.539 | −9.370 |

TABLE 8

(4th embodiment)

Entire zone lens system

| | | |
|---|---|---|
| Condition (29) $\left|\dfrac{\phi_1}{\phi_2}\right|$ | | 0.250 |

First lens unit (Gradient index lens is G1)

| | | |
|---|---|---|
| Condition (2) $\mathrm{sgn}(\phi 1) \cdot \dfrac{N_1 d1}{\phi 1^2}$ | | 0.219 |
| Condition (8) $\dfrac{N_1 d1}{\phi 1G^2}$ | | −0.219 |
| Condition (8) $\left|\dfrac{N_2 d1}{\phi 1G^4}\right|$ | | 0.061 |
| Condition (7) $\dfrac{N_1 F1 - N_1 d1}{\phi 1G^2}$ | | 0.023 |
| Condition (7) $\dfrac{N_1 C1 - N_1 d1}{\phi 1G^2}$ | | −0.009 |
| Condition (10) $\dfrac{\phi 1GM}{\phi 1GS}$ | | 0.115 |
| Condition (11) $\dfrac{R_{12} + R_{11}}{R_{12} - R_{11}}$ | | 1.030 |

| | Condition (5) $\dfrac{v_d(H) - v_d(0)}{v_d(0)}$ |
|---|---|
| 0.0H max | 0.000 |
| 0.1H max | −0.005 |
| 0.2H max | −0.020 |
| 0.3H max | −0.046 |
| 0.4H max | −0.083 |
| 0.5H max | −0.131 |
| 0.6H max | −0.189 |
| 0.7H max | −0.259 |
| 0.8H max | −0.341 |
| 0.9H max | −0.435 |
| 1.0H max | −0.541 |

TABLE 8-continued (4th embodiment)

Second lens unit (Gradient index lens G2)

| | | |
|---|---|---|
| Condition (2) $\mathrm{sgn}(\phi 2) \cdot \dfrac{N_1 d2}{\phi 2^2}$ | | 1.171 |
| Condition (3) $\dfrac{N_1 d2}{\phi 2^2}$ | | −1.171 |
| Condition (15) $\left|\dfrac{N_2 d2}{\phi 2G^4}\right|$ | | 1.629 |
| Condition (14) $\dfrac{N_1 F2 - N_1 d2}{\phi 2G^2}$ | | −0.018 |
| Condition (14) $\dfrac{N_1 C2 - N_1 d2}{\phi 2G^2}$ | | 0.006 |
| Condition (16) $\dfrac{\phi 2GM}{\phi 2GS}$ | | 0.895 |
| Condition (17) $\dfrac{R_{22} + R_{21}}{R_{22} - R_{21}}$ | | −1.285 |
| Condition (18) $\dfrac{\phi 2H}{\phi 2G}$ | | 0.210 |

| | Condition (13) $\dfrac{v_d(H) - v_d(0)}{v_d(0)}$ | Condition (19) $\dfrac{\phi_a - \phi_{0a}}{\phi 2}$ | |
|---|---|---|---|
| | | (r3) | (r4) |
| 0.0H max | 0.000 | 0.000 | 0.000 |
| 0.1H max | 0.010 | −0.016 | −0.008 |
| 0.2H max | 0.041 | −0.059 | −0.029 |
| 0.3H max | 0.093 | −0.115 | −0.057 |
| 0.4H max | 0.166 | −0.169 | −0.085 |
| 0.5H max | 0.261 | −0.202 | −0.100 |
| 0.6H max | 0.377 | −0.200 | −0.087 |
| 0.7H max | 0.516 | −0.153 | −0.034 |
| 0.8H max | 0.677 | −0.036 | 0.058 |
| 0.9H max | 0.847 | 0.215 | 0.152 |
| 1.0H max | 0.983 | 0.736 | 0.148 |

Fourth lens unit (Gradient index lens G5)

| | | |
|---|---|---|
| Condition (2) $\mathrm{sgn}(\phi 4) \cdot \dfrac{N_1 d4}{\phi 4^2}$ | | 0.573 |
| Condition (23) $\dfrac{N_1 d4}{\phi 4G^2}$ | | −0.573 |
| Condition (24) $\left|\dfrac{N_2 d4}{\phi 4G^4}\right|$ | | 0.190 |
| Condition (22) $\dfrac{N_1 F4 - N_1 d4}{\phi 4G^2}$ | | 0.004 |

TABLE 8-continued (4th embodiment)

| | | |
|---|---|---|
| Condition (22) $\dfrac{N_1C4 - N_1d4}{\phi 4G^2}$ | | -0.002 |
| Condition (25) $\dfrac{\phi 4GM}{\phi 4GS}$ | | 0.368 |
| Condition (26) $\dfrac{R_{42} + R_{41}}{R_{42} - R_{41}}$ | | 2.449 |
| Condition (21) $\dfrac{v_d(H) - v_d(0)}{v_d(0)}$ | Condition (27) $\dfrac{\phi_a - \phi_{0a}}{\phi 4}$ (r10) | |
| 0.0H max | 0.000 | 0.0747 |
| 0.1H max | -0.004 | 0.744 |
| 0.2H max | -0.016 | 0.734 |
| 0.3H max | -0.035 | 0.716 |
| 0.4H max | -0.062 | 0.678 |
| 0.5H max | -0.097 | 0.591 |
| 0.6H max | -0.139 | 0.408 |
| 0.7H max | -0.187 | 0.039 |
| 0.8H max | -0.242 | -0.721 |
| 0.9H max | -0.304 | -2.398 |
| 1.0H max | -0.370 | -5.365 |

What is claimed is:

1. A zoom lens system comprising, from the object side:
   a first lens unit having positive refractive power;
   a second lens unit having negative refractive power;
   a third lens unit; and
   a fourth lens unit,
wherein said zoom lens system varies magnification by changing a distance between at least said first lens unit and second lens unit,
wherein at least one of said lens units includes a gradient index lens expressed by the following equation:

$$N(H) = N_0 + N_1 \cdot H^2 + N_2 \cdot H^4 + N_3 \cdot H^6 \ldots$$

where,
   H: height in the direction perpendicular to the optical axis;
   $N_0$: refractive index along the optical axis; and
   $N_i$ (i=1,2,3 . . . ): 2ith refractive index distribution coefficient,
said gradient index lens having at least one aspherical surface which has a refractive power.

2. A zoom lens system as claimed in claim 1, wherein said first lens unit comprises a single lens element.

3. A zoom lens system as claimed in claim 1, wherein said second lens unit comprises a single lens element.

4. A zoom lens system as claimed in claim 1, wherein said third lens unit comprises a single lens element.

5. A zoom lens system as claimed in claim 1, wherein said fourth lens unit comprises a single lens element.

6. A zoom lens system as claimed in claim 1, wherein the following condition is fulfilled:

$$0.0 < sgn(\phi G) \cdot \frac{N_1}{\phi G^2} < 10.0$$

where,
   sgn($\phi$G): parameter whose value becomes +1 when the refractive power of the lens unit including a gradient index lens is negative, and -1 when the refractive power of the lens unit including a gradient index lens is positive;
   $N_1$: secondary refractive index distribution coefficient of the gradient index lens; and
   $\phi$G: refractive power of the gradient index lens.

7. A zoom lens system as claimed in claim 1, wherein said second lens unit includes the gradient index lens and the following condition is fulfilled:

$$-5.0 < \frac{N_1 d2}{\phi_2^2} < 10.0$$

where,
   $N_1 d2$: secondary refractive index distribution coefficient of the gradient index lens used in the second lens unit relative to the d-line; and
   $\phi_2$: refractive power of the second lens unit.

8. A zoom lens system as claimed in claim 1, wherein said first lens unit includes the gradient index lens and following conditions are fulfilled:
   in a range defined by 0<H<0.5 H max, $$\frac{d}{dH}\{v_d(H)\} < 0.0$$

in a range defined by 0<H<H max, $$-1.0 < \frac{v_d(H) - v_d(0)}{v_d(0)} \leq 0.0$$

where,
   H: height in the direction perpendicular to the optical axis;
   H max: maximum value for height in the direction perpendicular to the optical axis (effective aperture);
   d/dH: differential symbol; and
   $v_d(H)$: dispersion of the gradient index lens at a point that is height H away from the optical axis, in the direction perpendicular to the optical axis.

9. A zoom lens system as claimed in claim 1, wherein said first lens unit includes the gradient index lens and the following condition is fulfilled:

$$-0.1 < \frac{N_1\lambda 1 - N_1 d1}{\phi 1 G^2} < 0.1$$

where,
   $N_1 d1$: secondary refractive index distribution coefficient of the gradient index lens used in the first lens unit relative to the d-line;
   $N_1\lambda 1$: secondary refractive index distribution coefficient of the gradient index lens used in the first lens unit relative to the C-line or the F-line; and,
   $\phi 1G$ refractive power of the gradient index lens used in the first lens unit.

10. A zoom lens system as claimed in claim 1, wherein said first lens unit includes the gradient index lens and the following condition is fulfilled;

$$-2.0 < \frac{N_1 d1}{\phi 1 G^2} < 1.0$$

where, $N_1 d1$: secondary refractive index distribution coefficient of the gradient index lens used in the first lens unit relative to the d-line; and, $\phi 1G$: refractive power of the gradient index lens used in the first lens unit.

11. A zoom lens system as claimed in claim 1, wherein said first lens unit includes the gradient index lens and the following condition is fulfilled;

$$\left| \frac{N_2 d1}{\phi 1 G^4} \right| < 100$$

where, $N_2 d1$: quaternary refractive index distribution coefficient of the gradient index lens used in the first lens unit relative to the d-line; and, $\phi 1G$: refractive power of the gradient index lens used in the first lens unit.

12. A zoom lens system as claimed in claim 1, wherein said first lens unit includes the gradient index lens and the following condition is fulfilled;

$$-0.2 < \frac{\phi 1 GM}{\phi 1 GS} < 0.5$$

where, $\phi 1GS$: refractive power of the surface of the gradient index lens used in the first lens unit; and $\phi 1GM$: refractive power of the medium of the gradient index lens used in the first lens unit.

13. A zoom lens system as claimed in claim 1, wherein the first lens unit comprises a single gradient index lens having at least one aspherical surface, said single gradient index lens comprising either a positive lens having a strongly curved convex surface on the object side or a positive meniscus lens with the convex surface on the object side.

14. A zoom lens system as claimed in claim 1, wherein the first lens unit includes the gradient index lens and the following condition is fulfilled;

$$0.0 < \frac{R_{12} + R_{11}}{R_{12} - R_{11}} < 5.0$$

where, $R_{11}$: radius of curvature of the object side surface of the first lens unit; and $R_{12}$: radius of curvature of the image side surface of the first lens unit.

15. A zoom lens system as claimed in claim 1, wherein said second lens unit includes the gradient index lens and the following conditions are fulfilled:

in a range defined by $0 < H < 0.5$ H max, $$\frac{d}{dH}\{v_d(H)\} > 0.0$$

in a range defined by $0 < H < H$ max, $$0.0 \leq \frac{v_d(H) - v_d(0)}{v_d(0)} < 2.0$$

where,

H: height in the direction perpendicular to the optical axis;

H max: maximum value for height in the direction perpendicular to the optical axis;

d/dH: differential symbol; and $v_d(H)$: dispersion of the gradient index lens at a point that is height H away from the optical axis in the direction perpendicular to the optical axis.

16. A zoom lens system as claimed in claim 1, wherein said second lens unit includes the gradient index lens and the following condition is fulfilled:

$$-0.1 < \frac{N_1 \lambda 2 - N_1 d2}{\phi 2 G^2} < 0.1 \qquad (14)$$

where, $N_1 d2$: secondary refractive index distribution coefficient of the gradient index lens used in the second lens unit relative to the d-line;

$N_1 \lambda 2$: secondary refractive index distribution coefficient of the gradient index lens used in the second lens unit relative to the C-line and the F-line; and, $\phi 2G$: refractive power of the gradient index lens used in the second lens unit.

17. A zoom lens system as claimed in claim 1, wherein said second lens unit includes the gradient index lens and the following condition is fulfilled:

$$\left| \frac{N_2 d2}{\phi 2 G^4} \right| < 1000$$

where, $N_2 d2$: quaternary refractive index distribution coefficient of the gradient index lens used in the second lens unit relative to the d-line; and $\phi 2G$: refractive power of the gradient index lens used in the second lens unit.

18. A zoom lens system as claimed in claim 1, wherein said second lens unit includes the gradient index lens and the following condition is fulfilled:

$$0.3 < \frac{\phi 2 GM}{\phi 2 GS} < 3.0$$

where, $\phi 2GS$: refractive power of the surface of the gradient index lens used in the second lens unit; and $\phi 2GM$: refractive power of the medium of the gradient index lens used in the second lens unit.

19. A zoom lens system as claimed in claim 1, wherein said second lens unit includes the gradient index lens and the following condition is fulfilled:

$$-5.0 < \frac{R_{22} + R_{21}}{R_{22} - R_{21}} < 0.0$$

where, $R_{21}$: radius of curvature of the object side surface of the second lens unit; and $R_{21}$: radius of curvature of the image side surface of the second lens unit.

20. A zoom lens system as claimed in claim 1, wherein the second lens unit comprises a single gradient index lens having at least one aspherical surface, said single gradient index lens comprising either a negative lens having a strongly curved concave surface on the image side or a negative meniscus lens having the concave surface on the image side.

21. A zoom lens system as claimed in claim 1, wherein the second lens unit includes the gradient index lens and a homogeneous lens, said second lens unit fulfills the following condition:

$$0.05 < \frac{\phi 2H}{\phi 2G} < 0.5$$

where, $\phi 2H$: refractive power of the homogeneous lens used in the second lens unit; and $\phi 2G$: refractive power of the gradient index lens used in the second lens unit.

22. A zoom lens system as claimed in claim 1, wherein said second lens unit includes the gradient index lens and the following condition is fulfilled:

in a range defined by 0<H<H max, $$-6.0 < \frac{\phi_a - \phi_{0a}}{\phi_2} < 5.0$$

where, $\phi_a$: local refractive power of the aspherical surface;

$\phi_{0a}$: refractive power based on the reference curvature of the aspherical surface; and $\phi_2$: refractive power of the second lens unit.

23. A zoom lens system as claimed in claim 1, wherein said fourth lens unit includes the gradient index lens and the following condition is fulfilled:

in a range defined by 0<H<0.5 H max, $$\frac{d}{dH}\{v_d(H)\} < 0.0$$

in a range defined by 0<H<H max, $$-1.0 < \frac{v_d(H) - v_d(0)}{v_d(0)} \leq 0.0$$

where,

H: height in the direction perpendicular to the optical axis;

H max: maximum value for height in the direction perpendicular to the optical axis;

d/dH: differential symbol; and $v_d(H)$: dispersion of the gradient index lens at a point that is height H away from the optical axis in the direction perpendicular to the optical axis.

24. A zoom lens system as claimed in claim 1, wherein said fourth lens unit includes the gradient index lens and the following condition is fulfilled:

$$-0.1 < \frac{N_1\lambda 4 - N_1 d4}{\phi 4G^2} < 0.1$$

where, $N_1 d4$: secondary refractive index distribution coefficient of the gradient index lens used in the fourth lens unit relative to the d-line;

$N_1\lambda 4$: secondary refractive index distribution coefficient of the gradient index lens used in the fourth lens unit relative to the C-line and the F-line; and, $\phi 4G$: refractive power of the gradient index lens used in the fourth lens unit.

25. A zoom lens system as claimed in claim 1, wherein said fourth lens unit includes the gradient index lens and the following condition is fulfilled:

$$-10.0 < \frac{N_1 d4}{\phi 4G^2} < 5.0$$

where, $N_1 d4$: secondary refractive index distribution coefficient of the gradient index lens used in the fourth lens unit relative to the d-line; and $\phi 4G$: refractive power of the gradient index lens used in the fourth lens unit.

26. A zoom lens system as claimed in claim 1, wherein said fourth lens unit includes the gradient index lens and the following condition is fulfilled:

$$\left| \frac{N_2 d4}{\phi 4G^4} \right| < 1000$$

where, $N_2 d4$: quaternary refractive index distribution coefficient of the gradient index lens used in the fourth lens unit relative to the d-line; and, $\phi 4G$: refractive power of the gradient index lens used in the fourth lens unit.

27. A zoom lens system as claimed in claim 1, wherein said fourth lens unit includes the gradient index lens and the following condition is fulfilled:

$$-0.2 < \frac{\phi 4GM}{\phi 4GS} < 3.0$$

where, $\phi 4GS$: refractive power of the surface of the gradient index lens used in the fourth lens unit; and $\phi 4GM$: refractive power of the medium of the gradient index lens used in the fourth lens unit.

28. A zoom lens system as claimed in claim 1, wherein said fourth lens unit includes the gradient index lens and the following condition is fulfilled:

$$0.0 < \frac{R_{42} + R_{41}}{R_{42} - R_{41}} < 5.0$$

where, $R_{41}$: radius of curvature of the object side surface of the fourth lens unit; and $R_{42}$: radius of curvature of the image side surface of the fourth lens unit.

29. A zoom lens system as claimed in claim 1, wherein the fourth lens unit comprises a single gradient index lens having at least one aspherical surface, said single gradient index lens comprising either a positive lens having a strongly curved convex surface on the object side or a positive meniscus lens.

30. A zoom lens system as claimed in claim 1, wherein said fourth lens unit includes the gradient index lens and the following condition is fulfilled:

in a range defined by 0<H<H max $$-20.0 < \frac{\phi_a - \phi_{0a}}{\phi_4} < 10.0$$

where, $\phi_a$: local refractive power of the aspherical surface;

$\phi_{0a}$: refractive power based on the reference curvature of the aspherical surface; and $\phi_4$: refractive power of the fourth lens unit.

31. A zoom lens system as claimed in claim 1, wherein the following condition is fulfilled:

$$0.1 < \left|\frac{\phi_1}{\phi_2}\right| < 0.4$$

where, $\phi_1$: refractive power of first lens unit; and $\phi_2$: refractive power of second lens unit.

32. A zoom lens system comprising, from the object side:

a first lens unit having positive refractive power;

a second lens unit having negative refractive power;

a third lens unit having positive refractive power; and a fourth lens unit having positive refractive power, said fourth lens unit consisting of a single gradient index lens expressed by the following equation:

$$N(H)=N_0+N_1.H^2+N_2.H^4+N_3.H^6 \ldots$$

where,

H: height in the direction perpendicular to the optical axis;

$N_0$: refractive index along the optical axis; and $N_i$ (i=1,2,3 . . . ): 2ith refractive index distribution coefficient, said gradient index lens having at least one aspherical surface which has a refractive power, and wherein said zoom lens system varies magnification by changing a distance between at least said first lens unit and said second lens unit.

33. A zoom lens system comprising, from the object side:

a first lens unit having positive refractive power;

a second lens unit having negative refractive power, said second lens unit consisting of a single gradient index lens expressed by the following equation:

$$N(H)=N_0+N_1.H^2+N_2.H^4+N_3.H^6 \ldots$$

where,

H: height in the direction perpendicular to the optical axis;

$N_0$: refractive index along the optical axis; and $N_i$ (i=1,2,3 . . . ): 2ith refractive index distribution coefficient;

a third lens unit having positive refractive power; and a fourth lens unit having positive optical power;

said gradient index lens having at least one aspherical surface which has a refractive power; and wherein said zoom lens system varies magnification by changing a distance between at least said first lens unit and said second lens unit.

34. A zoom lens system comprising, from the object side:

a first lens unit having positive refractive power;

a second lens unit having negative refractive power, said second lens unit comprising a homogeneous lens element and a gradient index lens element expressed by the following equation:

$$N(H)=N_0+N_1.H^2+N_2.H^4+N_3.H^6 \ldots$$

where,

H: height in the direction perpendicular to the optical axis;

$N_0$: refractive index along the optical axis; and $N_i$ (i=1,2,3 . . . ): 2ith refractive index distribution coefficient;

a third lens unit having positive refractive power; and a fourth lens unit having positive optical power;

said gradient index lens having at least one aspherical surface which has a refractive power; and wherein said zoom lens system varies magnification by changing a distance between at least said first lens unit and said second lens unit.

35. A zoom lens system for forming an image of an object onto a solid state image device, comprising, from the object side:

a first lens unit having positive refractive power;

a second lens unit having negative refractive power;

a third lens unit;

a fourth lens unit; and a filter provided between said fourth lens unit and an image plane, wherein said zoom lens system varies magnification by changing a distance between at least said first lens unit and said second lens unit, and wherein at least one of said lens units includes a gradient index lens expressed by the following equation:

$$N(H)=N_0+N_1.H^2+N_2.H^4+N_3.H^6 \ldots$$

where,

H: height in the direction perpendicular to the optical axis;

$N_0$: refractive index along the optical axis; and $N_i$ (i=1,2,3 . . . ): 2ith refractive index distribution coefficient, said gradient index lens having at least one aspherical surface which has a refractive power.

36. A zoom lens system for forming an image of an object onto a solid state image device, comprising, from the object side:

a first lens unit having positive refractive power;

a second lens unit having negative refractive power;

a third lens unit having positive refractive power; and a fourth lens unit having positive refractive power; and a filter provided between said fourth lens unit and an image plane, said fourth lens unit consisting of a single gradient index lens expressed by the following equation:

$$N(H)=N_0+N_1.H^2+N_2.H^4+N_3.H^6 \ldots$$

where,

H: height in the direction perpendicular to the optical axis;

$N_0$: refractive index along the optical axis; and $N_i$ (i=1,2,3 . . . ): 2ith refractive index distribution coefficient, said gradient index lens having at least one aspherical surface which has a refractive power, and wherein said zoom lens system varies magnification by changing a distance between at least said first lens unit and said second lens unit.

37. A zoom lens system for forming an image of an object onto a solid state imaging device, comprising, from the object side:

a first lens unit having positive refractive power;

a second lens unit having negative refractive power, said second lens unit consisting of a single gradient index lens element expressed by the following equation:

$$N(H)=N_0+N_1.H^2+N_2.H^4+N_3.H^6 \ldots$$

where,

H: height in the direction perpendicular to the optical axis;

$N_0$: refractive index along the optical axis; and $N_i$ (i=1,2,3 . . . ): 2ith refractive index distribution coefficient;

a third lens unit having positive refractive power;

a fourth lens unit having positive optical power; and a filter provided between said fourth lens unit and an image plane, said gradient index lens having at least one aspherical surface which has refractive power, and wherein said zoom lens system varies magnification by changing a distance between at least said first lens unit and said second lens unit.

38. A zoom lens system for forming an image of an object onto a solid state imaging device, comprising, from the object side:

a first lens unit having positive refractive power;

a second lens unit having negative refractive power, said second lens unit consisting of a single gradient index lens element expressed by the following equation:

$$N(H)=N_0+N_1.H^2+N_2.H^4+N_3.H^6 \ldots$$

where,

H: height in the direction perpendicular to the optical axis;

$N_0$ refractive index along the optical axis; and $N_i$ (i=1,2,3 . . . ): 2ith refractive index distribution coefficient, a third lens unit having positive refractive power;

a fourth lens unit having positive optical power; and a filter provided between said fourth lens unit and an image plane, said gradient index lens having at least one aspherical surface which has a refractive power, and wherein said zoom lens system varies magnification by changing a distance between at least said first lens unit and said second lens unit.

* * * * *